(12) United States Patent
Shinohara

(10) Patent No.: US 8,320,379 B2
(45) Date of Patent: Nov. 27, 2012

(54) ARBITER CIRCUIT AND METHOD OF CARRYING OUT ARBITRATION

(75) Inventor: Masayuki Shinohara, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 201 days.

(21) Appl. No.: 12/847,862

(22) Filed: Jul. 30, 2010

(65) Prior Publication Data

US 2011/0007734 A1    Jan. 13, 2011

Related U.S. Application Data

(63) Continuation of application No. 11/283,768, filed on Nov. 22, 2005, now Pat. No. 7,787,467, which is a continuation of application No. 09/820,351, filed on Mar. 29, 2001, now Pat. No. 6,999,457.

(30) Foreign Application Priority Data

Mar. 29, 2000    (JP) .................................. 2000-090444

(51) Int. Cl.
H04L 12/28 (2006.01)
(52) U.S. Cl. .................................... 370/394; 370/395.4
(58) Field of Classification Search .................. 370/394, 370/395.42, 462, 229, 412; 709/201
See application file for complete search history.

(56) References Cited

U.S. PATENT DOCUMENTS

| | | | |
|---|---|---|---|
| 5,278,828 A | 1/1994 | Chao | |
| 5,519,698 A | 5/1996 | Lyles et al. | |
| 5,535,202 A | 7/1996 | Kondoh | |
| 5,784,374 A | 7/1998 | Runaldue | |
| 6,072,772 A | 6/2000 | Chamy et al. | |
| 6,249,528 B1 | 6/2001 | Kothary | |
| 6,330,584 B1 | 12/2001 | Joffe et al. | |
| 6,513,108 B1 | 1/2003 | Kerr et al. | |
| 6,667,984 B1 | 12/2003 | Chao et al. | |
| 6,885,639 B2 | 4/2005 | Kamiya | |
| 6,963,576 B1 | 11/2005 | Lee | |
| 6,999,457 B2 | 2/2006 | Shinohara | |
| 2001/0026558 A1 | 10/2001 | Kamiya | |
| 2001/0033581 A1 | 10/2001 | Kawarai et al. | |
| 2002/0136230 A1 | 9/2002 | Dell et al. | |

FOREIGN PATENT DOCUMENTS

| | | |
|---|---|---|
| JP | 7-297831 | 11/1995 |
| JP | 9-321768 | 12/1997 |
| JP | 10-32585 | 2/1998 |
| JP | 2894442 | 3/1999 |
| JP | 2001-7822 | 1/2001 |

OTHER PUBLICATIONS

Co-pending U.S. Appl. No. 11/283,768, filed Nov. 22, 2005 entitled "Arbiter Circuit and Method of Carrying Out Arbitration", by Masayuki Shinohara, 79 pages.

Primary Examiner — Jung Park
(74) Attorney, Agent, or Firm — Harrity & Harrity, LLP

(57) ABSTRACT

A method of carrying out arbitration in a packet exchanger including an input buffer temporarily storing a packet having arrived at an input port, and a packet switch which switches a packet between a specific input port and a specific output port, includes the steps of (a) concurrently carrying out a first plurality of sequences in each of the sequences basic processes for at least one of the input buffer and the output port are carried out in a predetermined order, and (b) making an allowance in each of the sequences for packets to be output through output through output ports at different times from one another.

10 Claims, 25 Drawing Sheets

ARBITER CIRCUIT AND METHOD OF CARRYING OUT ARBITRATION

RELATED APPLICATIONS

This application is a continuation of U.S. application Ser. No. 11/283,768, filed Nov. 22, 2005, now U.S. Pat. No. 7,787,467, which is a continuation of U.S. application Ser. No. 09/820,351, filed Mar. 29, 2001, now U.S. Pat. No. 6,999,457, the entire disclosures of which are incorporated herein by reference.

FIELD OF THE INVENTION

The invention relates to an arbiter circuit used in a packet exchanger, and more particularly to an arbiter circuit used in a packet exchanger which switches a packet between a specific input port and a specific output port by virtue of packet communication technique such as asynchronous transfer mode (ATM). The invention relates further to a method of carrying out arbitration in such a packet exchanger.

DESCRIPTION OF THE RELATED ART

FIG. 1 is a block diagram of a conventional packet exchanger.

The illustrated packet exchanger is comprised of input ports 500-1 to 500-$n$, output ports 501-1 to 501-$n$, a packet switch 5 which switches a packet between the input ports 500-1 to 500-$n$ and the output ports 501-1 to 501-$n$, input buffers 7-1 to 7-$n$ temporarily accumulating packets having arrived at the input ports 500-1 to 500-$n$, an arbiter circuit 6, and input highways 502-1 to 502-$n$ connecting the input buffers 7-1 to 7-$n$ to the packet switch 5.

As illustrated in FIG. 2, the packet switch 5 is designed to turn on or off intersections 50 at each of which transmission lines extending in a grid intersect with each other.

The packet switch 5 illustrated in FIG. 2 is accompanied with a problem that when a plurality of the input ports concurrently transmit packets to a specific output port, packets would make collision with one another, resulting in destruction of data carried by the packets. Accordingly, it is necessary in the packet switch 5 to allow only one input port to transmit a packet to a specific output port at certain timing.

As illustrated in FIG. 1, each of the input buffers 7-1 to 7-$n$ is designed to include an input device 72, an output device 73, and logical queues 71-1 to 71-$n$ in association with the output ports 501-1 to 501-$n$. The input device 72 accumulates packets having arrived at the input ports 500-1 to 500-$n$, in a trail in one of the logical queues 71-1 to 71-$n$ in dependence on destination of the queue. The output device 73 takes a packet out of a head of the one of the logical queues 71-1 to 71-$n$, and transmits the packet to the packet switch 5.

The input buffers 7-1 to 7-$n$ transmit output request signals 600-1 to 600-$n$ to the arbiter circuit 6, respectively. The output request signals 600-1 to 600-$n$ indicate of which output port among the output ports 501-1 to 501-$n$ a packet accumulated in the input buffers 7-1 to 7-$n$ is directed.

The arbiter circuit 6 decides input and output ports between which a packet is to be switched in the packet switch 5 such that the packet does not make collision with other packets. After making such a decision, the arbiter circuit 6 transmits output allowance signals 601-1 to 601-$n$ indicative of the decision, to the input buffers 7-1 to 7-$n$.

Arbitration algorithm for deciding input and output ports between which a packet is to be switched is suggested, for instance, in "Analysis to scheduling algorithm in input buffer type ATM switch", Electronic Information Communication Society, B-6-20, 1998 (hereinafter, called "article 1") or "Analysis to High Capacity Packet Switch", Electronic Information Communication Society, SSE98-160 (hereinafter, called "article 2").

In accordance with the algorithm suggested in the article 1, output ports to which a cell accumulated in an input buffer is directed are searched, and one of output ports not yet occupied by any input buffers is selected. Such an output port is selected generally in accordance with the round-robin selection process.

The above-mentioned selection step is carried out for all of input buffers. That is, a basic process in which an output port to which a packet is transmitted from a certain input buffer is selected among output ports not yet occupied by any input buffers is carried out to input buffers in a predetermined order. In general, such a basic process is carried out starting from a smaller identification number of input buffers.

Hereinafter, the above-mentioned step is called input sequential arbitration, and a series of steps for carrying out the above-mentioned basic processes in a predetermined number is called an input sequence.

FIG. 3 is a flow-chart showing steps of carrying out the input sequence in the input sequential arbitration.

Hereinbelow is explained the input sequence in the input sequential arbitration, with reference to FIG. 3.

First, an order in input buffers is determined in step S41.

Then, all output ports are caused vacant in step S42.

Then, a variable K is substituted by 0 in step S43.

Then, an output port to which a K-th input buffer transmits a packet is selected among vacant output ports in step S44.

Thereafter, 1 is added to the variable K in step S45.

Then, the variable K is judged whether greater than (N−1) in step S46. If the variable K is not greater than (N−1) (NO in step S46), the steps S44 to S46 are repeated. If the variable K is greater than (N−1) (YES in step S46), the input sequence is finished.

In accordance with the algorithm suggested in the article 2, input buffers accumulating a cell which is to be transmitted to an output port are searched, and one of input buffers not yet receiving an allowance to transmit a packet to any one of output ports is selected. Such an input buffer is selected generally in accordance with the round-robin selection process.

The above-mentioned selection step is carried out for all of output ports. That is, a basic process in which an input buffer to be allowed to transmit a packet to a certain output port is selected among input buffers not having an allowance to transmit a packet is carried out to output buffers in a predetermined order. In general, such a basic process is carried out starting from a smaller identification number of output buffers.

Hereinafter, the above-mentioned step is called output sequential arbitration, and a series of steps for carrying out the above-mentioned basic processes in a predetermined number is called an output sequence.

FIG. 4 is a flowchart showing steps of carrying out the output sequence in the output sequential arbitration. Hereinbelow is explained the output sequence in the output sequential arbitration, with reference to FIG. 4.

First, an order in output ports is determined in step S51.

Then, all input buffers are caused vacant in step S52.

Then, a variable K is substituted by 0 in step S53.

Then, an input buffer to be allowed to transmit a packet to a K-th output port is selected among vacant input buffers in step S54.

Thereafter, 1 is added to the variable K in step S55.

Then, the variable K is judged whether greater than (N−1) in step S56. If the variable K is not greater than (N−1) (NO in step S56), the steps S54 to S56 are repeated. If the variable K is greater than (N−1) (YES in step S56), the output sequence is finished.

FIG. 5 is a timing chart showing a timing at which the input and output sequences are carried out in the input and output sequential arbitration.

In the conventional arbitration, after an input or output sequence has been started, an allowance for transmitting a packet at a certain time is made. After an input or output sequence has been finished, a next input or output sequence is made start. In order to transmit a packet at a maximum rate corresponding to a line rate, each of the input or output sequences is required to be completed within a unit period of time defined as a period of time necessary for transmitting a packet from an input buffer or a period of time necessary for a packet to pass through a line.

As mentioned earlier, the conventional packet exchanger was required to complete the input or output sequence in a unit period of time. In each of the input and output sequences, the basic process for individual input buffer or output port is carried out for all input buffers and output ports. Hence, the number of the basic processes to be carried out in each of the sequences is increased as the number of ports in the packet exchanger increases.

However, since a unit period of time remains unchanged when packets have the same size and a line rate remains unchanged, a time for carrying out the individual basic process has to be decreased down to 1/X, if the number of ports in the packet exchanger is multiplied by X wherein X is an integer equal to or greater than 2.

Accordingly, if the packet exchanger is designed to have an increased capacity, the arbiter circuit carrying out the arbitration has to be designed to have a process capacity thereof multiplied by X in rate, resulting in a significant increase in fabrication cost.

In addition, even if a plurality of classes classified by its priority, there the conventional packet exchanger does not have an algorithm for efficiently accumulating the classes.

Japanese Unexamined Patent Publication No. 7-297831 has suggested an input buffer type ATM switch circuit including a plurality of input buffers at an input of an ATM switch. In the suggested input buffer type ATM switch circuit, cells are grouped into a plurality of levels in dependence on delay of the cells. Each of the cells stores therein a period of time for which the cell can be stored in the input buffer for each identifiers of the cell.

The suggested circuit is comprised of a plurality of cell queues associated with each of the delay levels, a cell counter counting the number of cells accumulated in the input buffer, first means for generating arbitration data weighed in accordance with the delay levels of the cells, the period of time transmitted from the cell queue, and the number of the cells accumulated in the input buffer, and second means for, if a cell is requested to be directed to the same output port from the input buffers, allowing a cell to be transmitted to the output port from an input buffer which is most heavily weighed in the arbitration data generated by the first means.

Japanese Unexamined Patent Publication No. 10-32585 has suggested an ATM switch controller arranged between an input buffer and an output buffer, including a first circuit which monitors how degree the output buffer is used and transmits a signal indicative of a degree at which the output buffer is used, and a second circuit which arbitrates an output cell supplied to the ATM switch from the input buffer, in accordance with the signal.

Japanese Patent No. 2894442 (Japanese Unexamined Patent Publication No. 11-68779) has suggested a short cell switch having a variable length, which can process a low-rate voice signal in a short period of time. The short cell switch is comprised of predominantly of a hardware.

Japanese Unexamined Patent Publication No. 9-321768 has suggested an ATM exchange including an input buffer temporarily accumulating an ATM cell input through a certain input line, a cross-bar type switch exchanging an ATM cell output from the input buffer, and an arbiter circuit providing conditions for turning on or off the cross-bar type switch, in accordance with priority provided to FIFO in the input buffer. The input buffer includes FIFOs in the number equal to the number of output lines in each of input lines, a distributor distributing cells to FIFO associated with an output line number acquired from header data of the ATM cell, and a selector selecting FIFO from which a cell is to be read out, in accordance with a signal transmitted from the arbiter circuit. The arbiter circuit is comprised of a sub-arbiter circuit determining FIFO having highest priority, based on priority level information of FIFOs in the input lines, a master arbiter circuit carrying out arbitration in competition among the input lines, and an exchange table register in which correspondence between input line numbers and output line numbers is stored.

However, the above-mentioned problems remain unsolved even in the above mentioned Publications.

SUMMARY OF THE INVENTION

In view of the above-mentioned problems in the conventional arbiter circuits, it is an object of the present invention to provide a method of carrying out arbitration and an arbiter circuit both of which are capable of increasing a capacity of a packet exchanger even if an arbiter circuit includes a processor, having a low process capacity, and efficiently accumulating a plurality of classes classified in accordance with priority.

In one aspect of the present invention, there is provided a method of carrying out arbitration in a packet exchanger including an input buffer temporarily storing a packet having arrived at an input port, and a packet switch which switches a packet between a specific input port and a specific output port, the method including the steps of (a) concurrently carrying out a first plurality of sequences in each of the sequences basic processes for at least one of the input buffer and the output port are carried out in a predetermined order, and (b) making an allowance in each of the sequences for packets to be output through output ports at different times from one another.

In the method in accordance with the present invention, the sequences in each of which the basic processes are carried out in an order of the input buffers are concurrently carried out in the input sequential arbitration. The number of the sequences to be concurrently carried out may be equal to the number of ports in the packet exchanger. In each of the sequences concurrently carried out, an allowance for a packet to be output through an output port at a different time from other packets is made.

After a first plurality of sequences has been finished, a second plurality of sequences may be carried out. The basic process to be carried out for each of the input buffers in each of the sequences are completed within a unit period, of time defined as a period of time necessary for an input buffer to output a packet therefrom. In each of the sequences, the basic processes are carried out for different input buffers in the same unit period of time.

If the number of ports in a packet exchanger is multiplied by X for increasing a capacity of the packet exchanger, the number of the basic processes to be carried out in each of the sequences is multiplied by X, and the number of the sequences to be concurrently carried out is also multiplied by X. Since allowances for outputting packets at successive times are made in each of the sequences, it would be possible to output a packet at a maximum rate corresponding to a line rate, even if each of the sequences is completed in a period of time AX wherein A indicates a period of time before increasing a capacity of the packet exchanger.

The method in accordance with the present invention may be applied to the output sequential arbitration. The sequences in each of which the basic processes are carried out in an order of the output ports are concurrently carried out in the output sequential arbitration. In each of the sequences concurrently carried out, an allowance for a packet to be output through an output port at a different time from other packets is made. The basic process to be carried out for each of the output ports in each of the sequences is completed within the unit period of time. In each of the sequences, the basic processes are carried out for different output ports in the same unit period of time. Thus, the same advantages obtained in the input sequential arbitration can be obtained also in the output sequential arbitration.

Since the basic processes are carried out for different input buffers or output ports at the same timing in the sequences concurrently carried out, different unit modules are operated at the same timing in each of the sequences. If a capacity of a packet exchanger is increased by increasing the number of ports, the number of the sequences to be concurrently carried out is increased. However, it would not be necessary to increase a capability of each of the unit modules, resulting in that it would be possible to constitute the arbiter circuit including unit modules comprised of processors having a low capability.

It is preferable that each of the basic processes includes the step of (c) selecting an output port through which a packet is output from an input port, among output ports not yet occupied by any input buffers, the step being to be carried out in input sequential arbitration in which the basic processes are carried out for the input buffers in a predetermined order.

It is preferable that each of the basic processes includes the step of selecting an input buffer to be allowed to output a packet through an output port, among input buffers not yet allowed to do so, the step being to be carried out in output sequential arbitration in which the basic processes are carried out for the output ports in a predetermined order.

It is preferable that the basic process is completed in a unit period of time defined as a period of time necessary for the input buffers to output a packet, the basic process being carried out for at least one of the input buffers and the output ports in each of the sequences in the unit period of time.

The method may further include the step of concurrently carrying out a second plurality of sequences after the first plurality of sequences have been carried out, in which case, it is preferable that the second plurality of sequences is carried out in an order just opposite to an order in which the first plurality of sequences is carried out.

This prevents specific input buffers or output ports from preferentially acquiring an allowance to output a packet, resulting in prevention of significant non-uniformity between the input buffers and the output ports.

It is preferable that herein the first plurality of sequences starts being carried out at a first time and the second plurality of sequences starts being carried out at a second time later than the first time by a predetermined period of time.

It is preferable that each of the basic processes includes the steps of (a) selecting an input buffer to be allowed to output a packet having a higher priority among packets accumulated in the input buffers, and (b) selecting an input buffer to be allowed to output a packet having a lower priority among packets accumulated in the input buffers, in which case, the step (a) may be completed in a half of a unit period of time defined as a period of time necessary for the input buffers to output a packet, and the step (b) may be completed in a half of the unit period of time.

This would make it possible to switch packets classified to a plurality of priority classes, in accordance with priority of the packets.

For instance, the step (c) includes the steps of (c1) carrying out the basic processes for all of the input buffers with respect to a packet having a higher priority, and (c2) carrying out the basic processes for all of the input buffers with respect to a packet having a lower priority, in which case, it is preferable that each of the basic processes is completed in a half of a unit period of time defined as a period of time necessary for the input buffers to output a packet.

As an alternative, each of the basic processes may be completed in a unit of period of time defined as a period of time necessary for the input buffers to output a packet, and another sequence starts being carried out after the step (c1) have been completed.

This would make it possible to switch packets classified to a plurality of priority classes, in accordance with priority of the packets, without necessity of increasing a capacity of the unit modules.

In another aspect of the present invention, there is provided an arbiter circuit constituting a packet exchanger together with an input buffer temporarily storing a packet having arrived at an input port, and a packet switch which switches a packet between a specific input port and a specific output port, the arbiter circuit having functions of (a) concurrently carrying out a first plurality of sequences in each of the sequences basic processes for at least one of the input buffer and the output port are carried out in a predetermined order, and (b) making an allowance in each of the sequences for packets to be output through output ports at different times from one another.

It is preferable that an output port through which a packet, is output from an input port is selected among output ports not yet occupied by any input buffers in each of the basic processes which are carried out for the input buffers in a predetermined order.

It is preferable that an input buffer to be allowed to output a packet through an output port is selected among input buffers not yet allowed to do so in each of the basic processes which are carried out for the output ports in a predetermined order.

It is preferable that the basic process is completed in a unit period of time defined as a period of time necessary for the input buffers to output a packet, the basic process being carried out for at least one of the input buffers and he output ports in each of the sequences in the unit period of time.

The arbiter circuit may further include a function of concurrently carrying out a second plurality of sequences after carrying out the first plurality of sequences, in which case, it is preferable that the arbiter circuit carries out the second plurality of sequences in an order just opposite to an order in which the arbiter circuit carries out the first plurality of sequences.

As an alternative, the arbiter circuit may start carrying out the first plurality of sequences at a first time and the second plurality of sequences at a second time later than the first time by a predetermined period of time.

It is preferable that the arbiter circuit selects an input buffer to be allowed to output a packet having a higher priority among packets accumulated in the input buffers, and then selects an input buffer to be allowed to output a packet having a lower priority among packets accumulated in the input buffers, in each of the basic processes, in which case, it is preferable that the arbiter circuit selects the input buffer in a half of a unit period of time defined as a period of time necessary for the input buffers to output a packet.

It is preferable that the arbiter circuit carries out the basic processes for all of the input buffers firstly with respect to a packet having a higher priority, and secondly with respect to a packet having a lower priority, in which case, it is preferable that the arbiter circuit carries out each of the basic processes in a half of a unit period of time defined as a period of time necessary for the input buffers to output a packet.

It is preferable that the arbiter circuit carries out each of the basic processes in a unit of period of time defined as a period of time necessary for the input buffers to output a packet, and starts carrying out another sequence after the basic processes have been completed.

The arbiter circuit may be designed to include (a) a plurality of unit modules each associated with at least one of the input buffer and the output port, each of the unit modules carrying out the basic processes, and (b) a signal line connecting the unit modules to one another in a ring.

Each of the unit modules carries out the basic process for the associated input buffer or output port. After having carried out the basic process, each of the unit modules transmits data indicative of output ports not yet occupied by the input buffers and data indicative of the input buffers not yet having an allowance of transmitting a packet, to a next stage unit module through the signal line.

The arbiter circuit may include (a) a plurality of unit modules each associated with at least one of the input buffer and the output port, each of the unit modules carrying out the basic processes, (b) a first signal line connecting the unit modules to one another in a ring, a signal being transmitted through the first signal line in a first direction, and (c) a second signal line connecting the unit modules to one another in a ring, a signal being transmitted through the second signal line in a second direction opposite to the first direction. The arbiter circuit may include (a) a plurality of unit modules each associated with at least one of the input buffer and the output port, each of the unit modules carrying out the basic processes, (b) a first signal line connecting the unit modules to one another in a ring, a signal having a higher priority being transmitted through the first signal line, and (c) a second signal line connecting the unit modules to one another in a ring, a signal having a lower priority being transmitted through the second signal line.

It is preferable that the number of the sequences is equal to the number of ports in the packet exchanger.

In still another aspect of the present invention, there is provided a recording medium readable by a computer, storing a program therein for causing a computer to carry out the above-mentioned method.

There is further provided a recording medium readable by a computer, storing a program therein for causing a computer to act as the above-mentioned arbiter circuit.

The advantages obtained by the aforementioned present invention will be described hereinbelow.

In accordance with the present invention, a plurality of sequences, for instance, equal in number to ports are concurrently carried out, and the basic processes are carried out for different input buffers or output ports in a unit period of time in each of the sequences. Hence, even if the number of ports in a packet exchanger is multiplied by X for increasing a capacity of the packet exchanger, and each of the sequences takes a period of time multiplied by AX to be completed wherein A indicates a period of time before increasing a capacity of the packet exchanger, by increasing the number of the basic processes to be concurrently carried out, it would be possible to output a packet at a maximum rate corresponding to a line rate, ensuring no necessity in increasing a rate at which the basic process is to be carried out.

Regardless of the number of ports in a packet exchanger, the basic process is completed in the same period of time. In addition, the basic processes for the same input buffers or output ports are not carried out at the same time. This ensures no necessity in increasing a rate at which the basic process is to be carried out.

The unit modules associated with the input buffers or output ports may be arranged in a ring through the signal line. This arrangement ensures no necessity in increasing a rate at which the unit modules operate, because the basic processes are completed in the same period of time, even if the number of ports in a packet exchanger is increased.

In the method in accordance with the present invention, a second plurality of sequences may be concurrently carried out, after a first plurality of sequences have been carried out, in which case, it is preferable that the second plurality of sequences is carried out in an order just opposite to an order in which the first plurality of sequences is carried out.

This prevents specific input buffers or output ports from preferentially acquiring an allowance to output a packet, resulting in prevention of significant non-uniformity between the input buffers and the output ports.

Since the basic processes are carried out for different input buffers or output ports at the same timing in each of the sequences concurrently carried out, different unit modules are operated at the same timing in each of the sequences. Even if a capacity of a packet exchanger is increased by increasing the number of ports, it would not be necessary to increase a capacity of the unit modules, because the basic processes are designed to be completed in the same period of time.

In the output sequential arbitration in accordance with the present invention, the arbitration is carried out such that an allowance to be output through an output port is given to a packet having a higher priority, in each of the basic processes to be carried out for each of the output ports. If such an allowance is not given to a packet having a higher priority, an allowance to be output through an output port is given to a packet having a lower priority.

This would make it possible to efficiently switch packets classified to a plurality of priority classes, in accordance with priority of the packets.

In the input sequential arbitration in accordance with the present invention, the basic processes are carried out for all of the input buffers with respect to a packet having a higher priority, and then, the basic processes are carried out for all of the input buffers with respect to a packet having a lower priority. Each of the basic processes is completed in a half of a unit period of time defined as a period of time necessary for the input buffers to output a packet.

This would make it possible to switch packets classified to a plurality of priority classes, in accordance with priority of the packets.

As an alternative, the basic processes are carried out for all of the input buffers with respect to a packet having a higher priority, and then, the basic processes are carried out for all of the input buffers with respect to a packet having a lower priority, with each of the basic processes being completed in the unit of period of time. Another sequence starts being carried out just when the basic process for packets having a lower priority has been started.

This would make it possible to switch packets classified to a plurality, of priority classes, in accordance with priority of the packets, without increasing a capability of the arbiter circuit.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
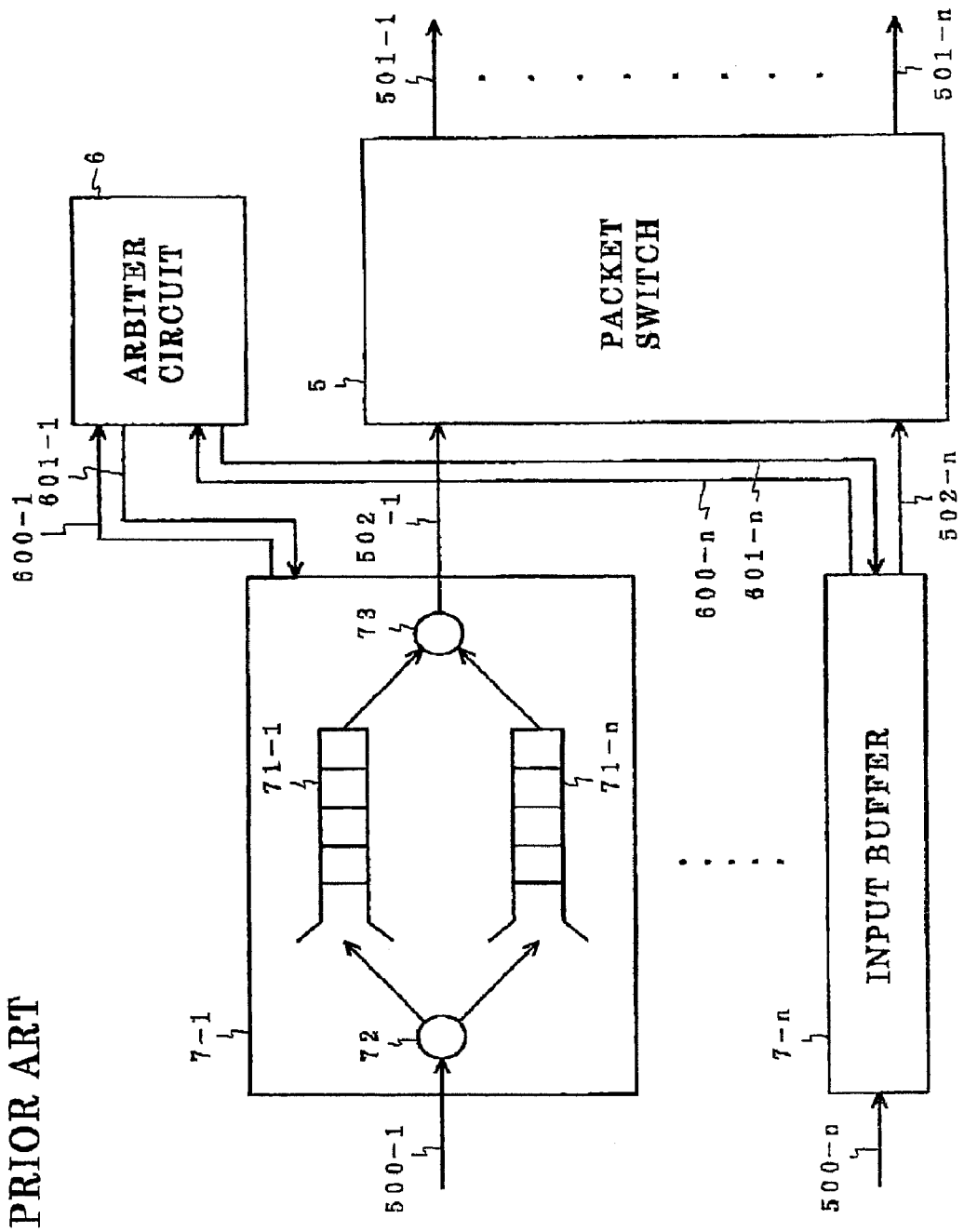
FIG. 1 is a block diagram of a conventional packet exchanger.
Figure 2:
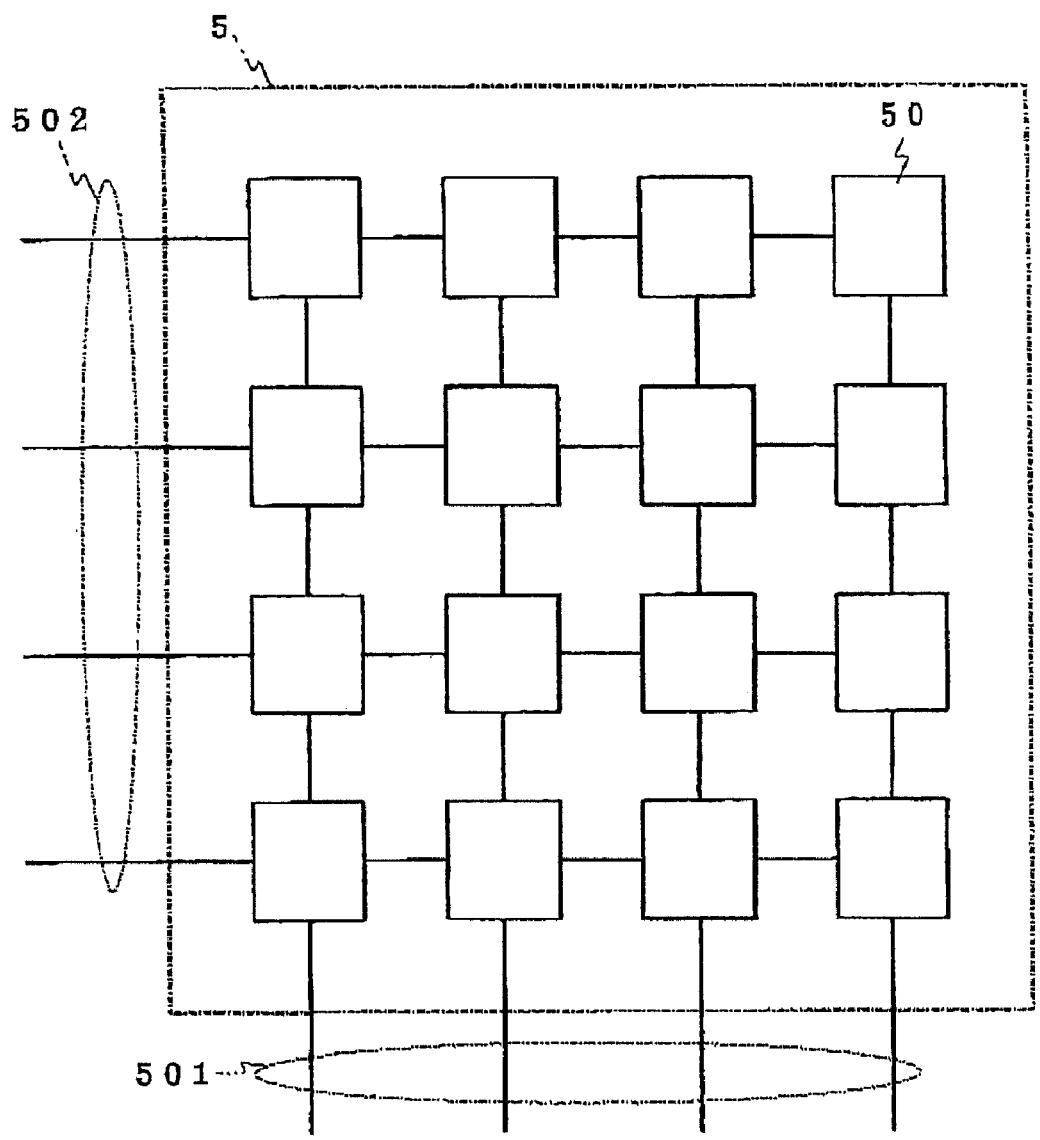
FIG. 2 is a block diagram of a packet switch as a part of the packet exchanger illustrated in FIG. 1.
Figure 3:
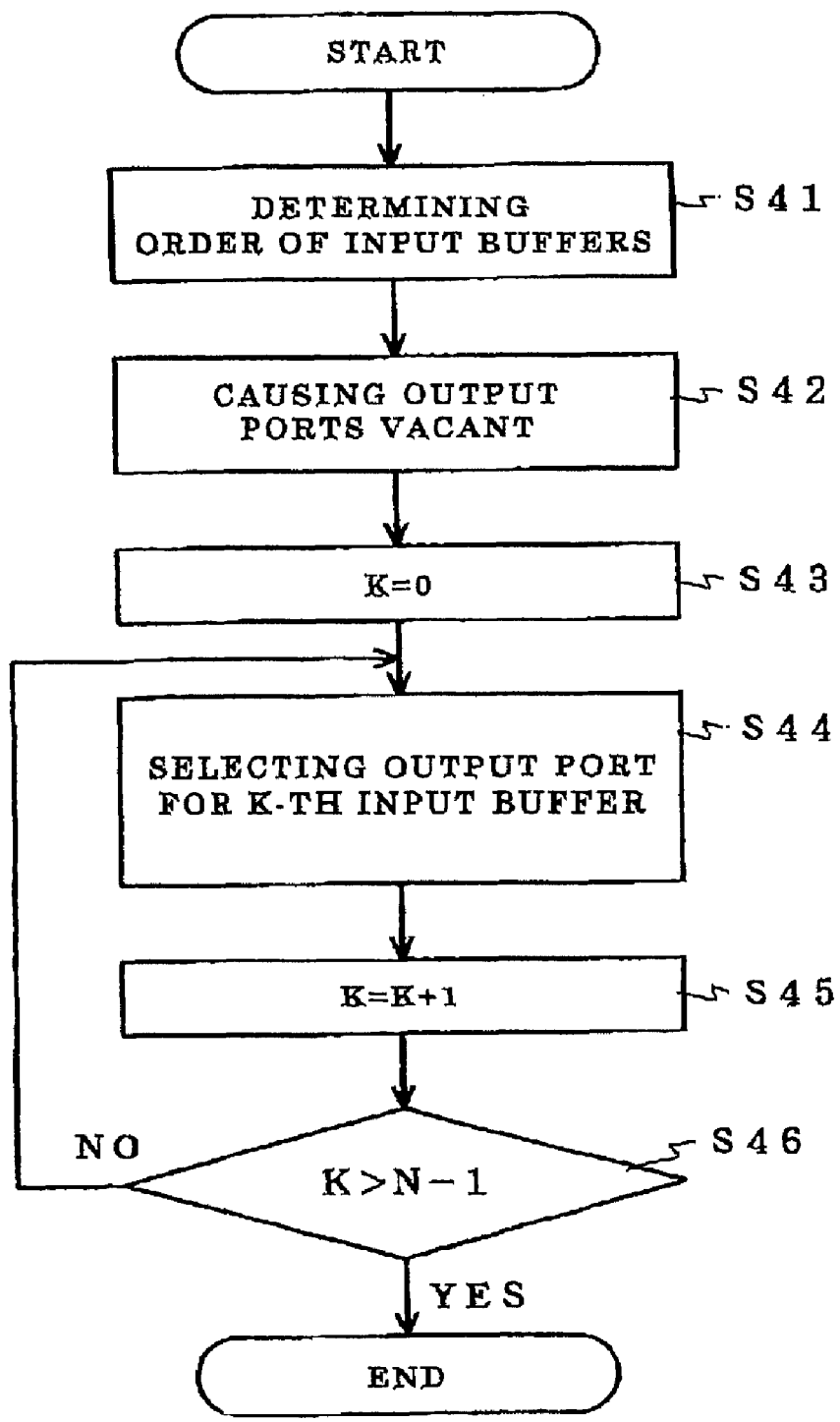
FIG. 3 is a flowchart showing the steps to be carried out in a sequence in the conventional input sequential arbitration.
Figure 4:
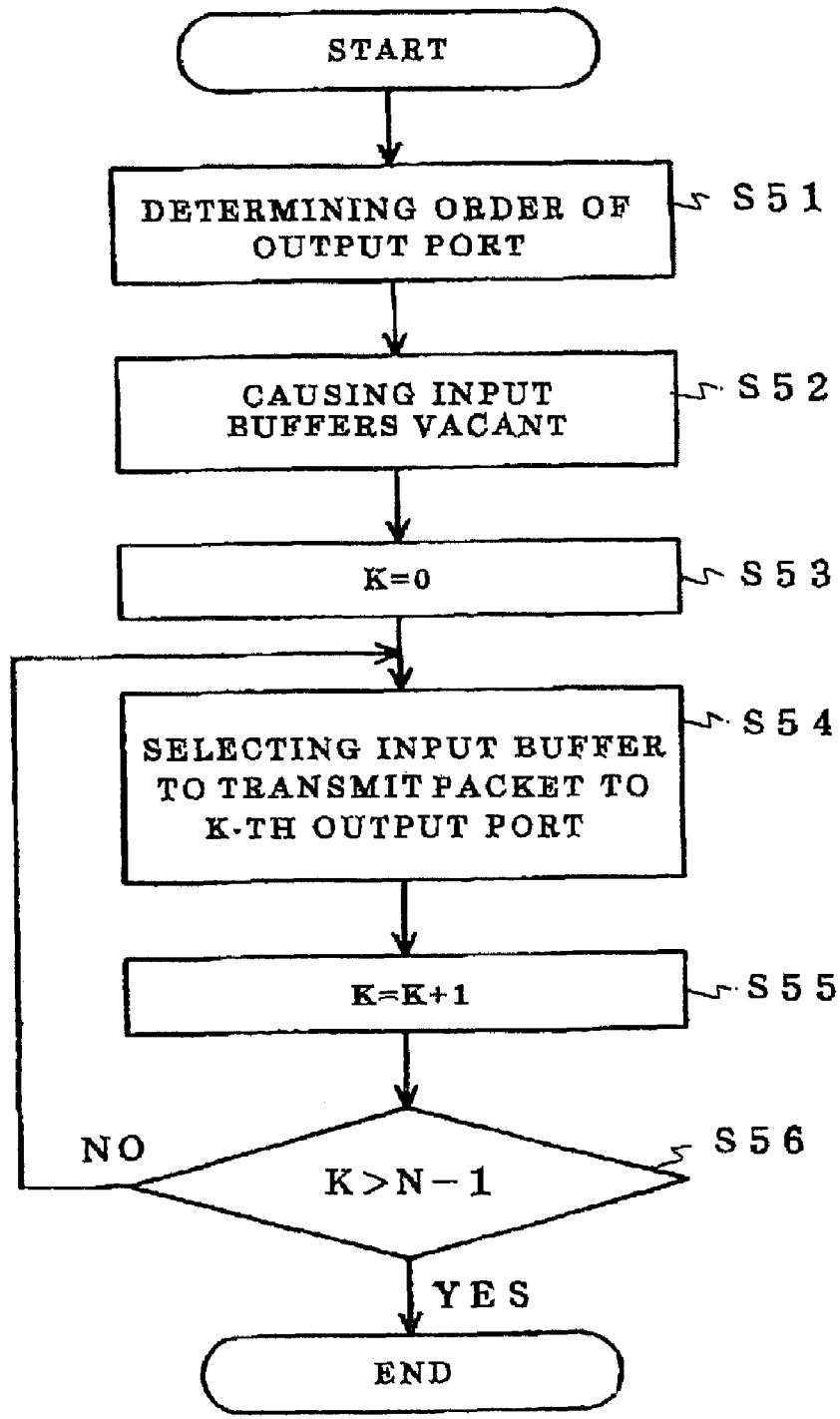
FIG. 4 is a flowchart showing the steps in a sequence to be carried out in the conventional output sequential arbitration.
Figure 5:
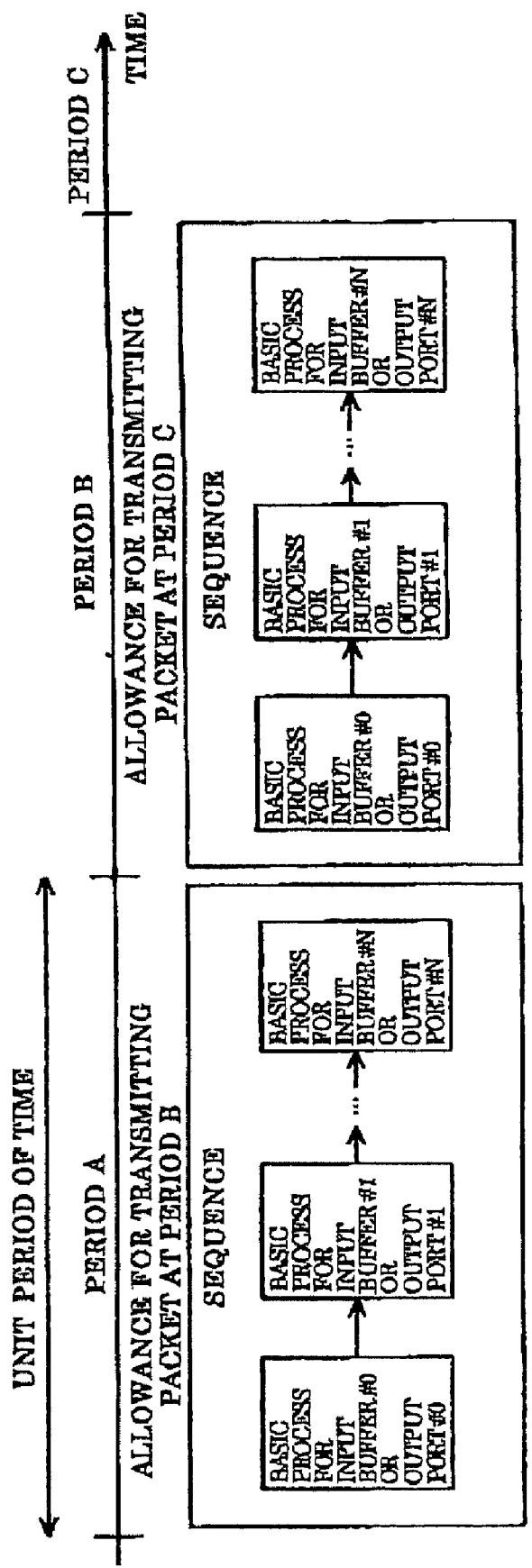
FIG. 5 is a timing-chart of a sequence to be carried out in the conventional input or output sequential arbitration.
Figure 6:
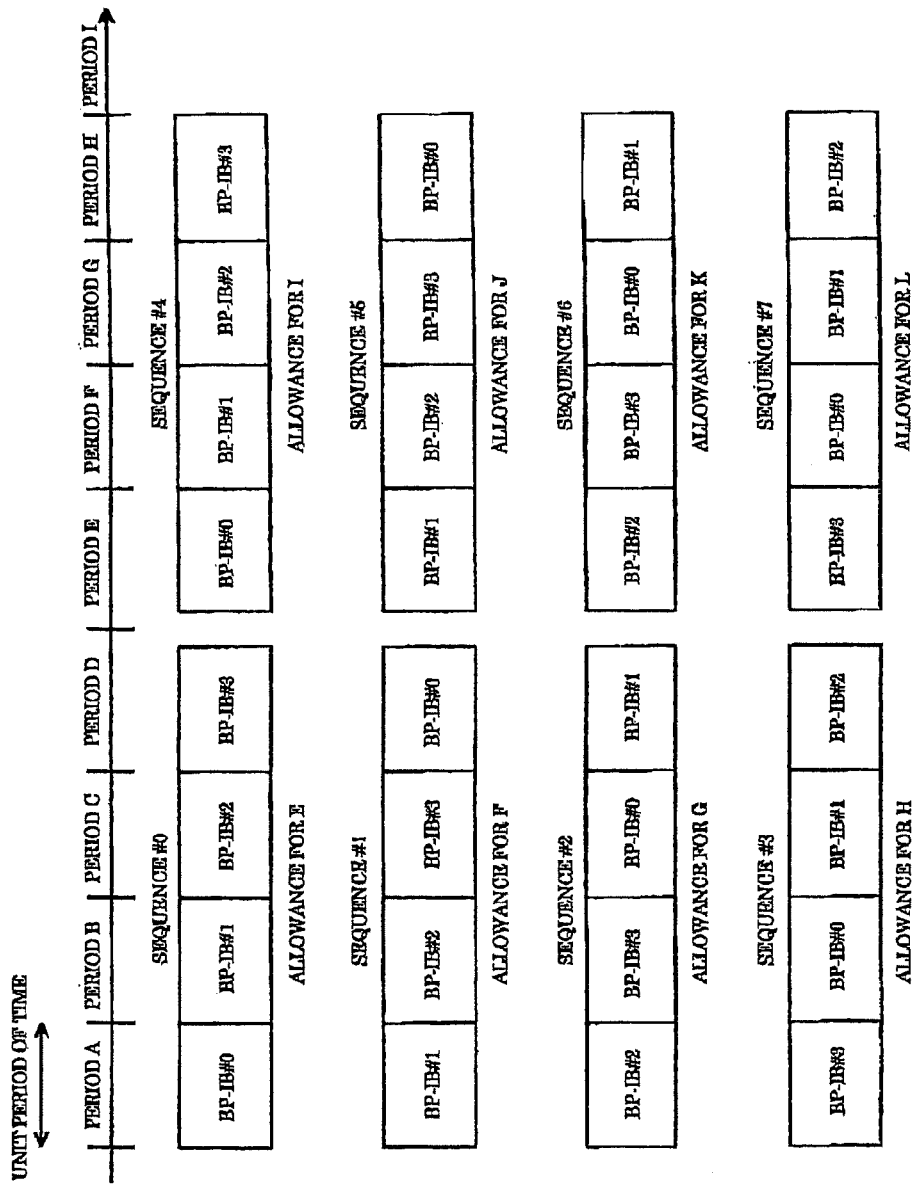
FIG. 6 is a timing chart showing a timing at which the input sequential arbitration is carried out in accordance with the first embodiment in a packet exchanger.

FIG. 6 is a timing chart showing a timing at which each of sequences is carried out in the input sequential arbitration in the method of carrying out arbitration in a packet exchanger, in accordance with the first embodiment.

It is assumed in the first embodiment that a packet exchanger has four input and output ports.

In the first embodiment, four sequences equal in number to the input and output ports are concurrently carried out. In each of the sequences, an allowance to transmit a packet at different times is made. In the first embodiment, as illustrated in FIG. 6, an allowance to transmit a packet at a time E is made in a first sequence #0, an allowance to transmit a packet at a time F is made in a second sequence #1, an allowance to transmit a packet at a time G is made in a third sequence #2, and an allowance to transmit a packet at a time H is made in a fourth sequence #3.

After the first to fourth sequences #0 to #3 have been completed, next four sequences #4 to #7 concurrently start being carried out. An allowance to transmit a packet at a time I is made in a fifth sequence #4, an allowance to transmit a packet at a time J is made in a sixth sequence #5, an allowance to transmit a packet at a time K is made in a seventh sequence #6, and an allowance to transmit a packet at a time L is made in a eighth sequence #7.

Since allowances to transmit a packet at successive time are made in the first to eighth sequences #0 to #7, even if each of the first to eighth sequences #0 to #7 take a time four times greater than a unit period of time for being completed, it would be possible to transmit a packet at a maximum rate corresponding to a line rate.

In the first sequence #0, the basic process for an input buffer #0 is first carried out, and then, the basic process for an input buffer #1 is carried out. Subsequently, the basic process for an input buffer #2 is first carried out, and then, the basic process for an input buffer #3 is carried out. Since each of the first to fourth sequences #1 to #4 may be completed within a period of time equal to a unit period of time multiplied by 4, each of the basic processes may be completed within a unit period of time.

Similarly to the first sequence #0, in the second sequence #1, the basic process for an input buffer #1 is first carried out, and then, the basic process for an input buffer #2 is carried out. Subsequently, the basic process for an input buffer #3 is first carried out, and then, the basic process for an input buffer #0 is carried out.

In the third sequence #2, the basic process for an input buffer #2 is first carried out, and then, the basic process for an input buffer #3 is carried out. Subsequently, the basic process for an input buffer #0 is first carried out, and then, the basic process for an input buffer #1 is carried out.

In the fourth sequence #3, the basic process for an input buffer #3. is first, carried out, and then, the basic process for an input buffer #0 is carried out. Subsequently, the basic process for an input buffer #1 is first carried out, and then, the basic process for an input buffer #2 is carried out.

As illustrated in FIG. 6, after the first to fourth sequences #0 to #3 have been completed, the fifth to eighth sequences #4 to #7 are concurrently carried out.

In the fifth sequence #4, the basic process for an input buffer #0 is first carried out, and then, the basic process for an input buffer #1 is carried out. Subsequently, the basic process for an input buffer #2 is first carried out, and then, the basic process for an input buffer #3 is carried out.

In the sixth sequence #5, the basic process for an input buffer #1 is first carried out, and then, the basic process for an input buffer #2 is carried out. Subsequently, the basic process for an input buffer #3 is first carried out, and then, the basic process for an input buffer #0 is carried out.

In the seventh sequence #6, the basic process for an input buffer #2 is first carried out, and then, the basic process for an input buffer #3 is carried out. Subsequently, the basic process for an input buffer #0 is first carried out, and then, the basic process for an input buffer #1 is carried out.

In the eighth sequence #7, the basic process for an input buffer #3 is first carried out, and then, the basic process for an input buffer #0 is carried out. Subsequently, the basic process for an input buffer #1 is first carried out, and then, the basic process for an input buffer #2 is carried out.

Figure 7:
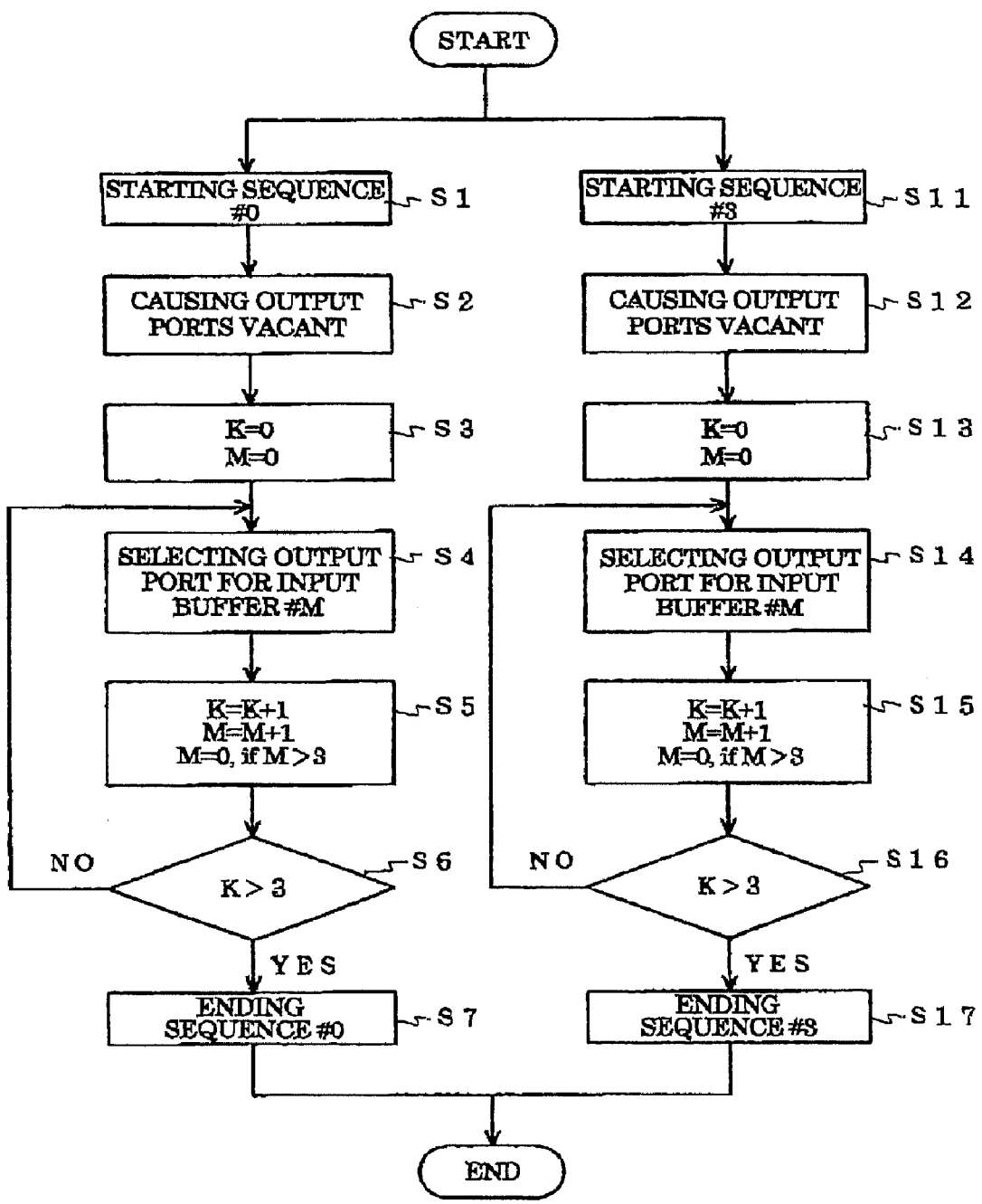
FIG. 7 is a flow-chart showing an operation of the input sequential arbitration carried out in accordance with the first embodiment.

FIG. 7 is a flow-chart showing an operation of sequences in the input sequential arbitration in the first embodiment. In FIG. 7, the sequences are carried out in parallel or independently of each other.

For instance, when the first sequence #0 starts being carried out in step 51, all output ports are caused vacant in step S2.

Then, a variable K is substituted by 0 and a variable M is substituted by 0 both in step S3.

Then, an output port through which a packet is transmitted from an input buffer #M is selected among vacant output ports in step S4.

Thereafter, 1 is added to the variable K in step S5. In addition, 1 is added to the variable M, and if the variable M is greater than 3 (M>3), the variable M is substituted by 0 in step S5.

Then, the variable K is judged whether greater than 3 (K>3) in step S6. If the variable K is not greater than 3 (NO in step S6), the steps S4 to S6 are repeated. If the variable K is greater than 3 (YES in step S6), the first sequence #0 is finished in step S7.

Similarly to the first sequence #0, when the fourth sequence #3 starts being carried out in step S11, all output ports are caused vacant in step S12.

Then, a variable K is substituted by 0 and a variable M is substituted by 0 both in step S13.

Then, an output port through which a packet is transmitted from an input buffer #M is selected among vacant output ports in step S14.

Thereafter, 1 is added to the variable K in step S15. In addition, 1 is added to the variable M, and if the variable M is greater than 3 (M>3), the variable M is substituted by 0 in step S15.

Then, the variable K is judged whether greater than 3 (K>3) in step S16. If the variable K is not greater than 3 (NO in step S16), the steps S4 to S6 are repeated. If the variable K is greater than 3 (YES in step S16), the fourth sequence #3 is finished in step S17.

Though the second and third sequences #1 and #2 are not illustrated in FIG. 7, they are carried out similarly to the first and fourth sequences #0 and #3.

Figure 8:
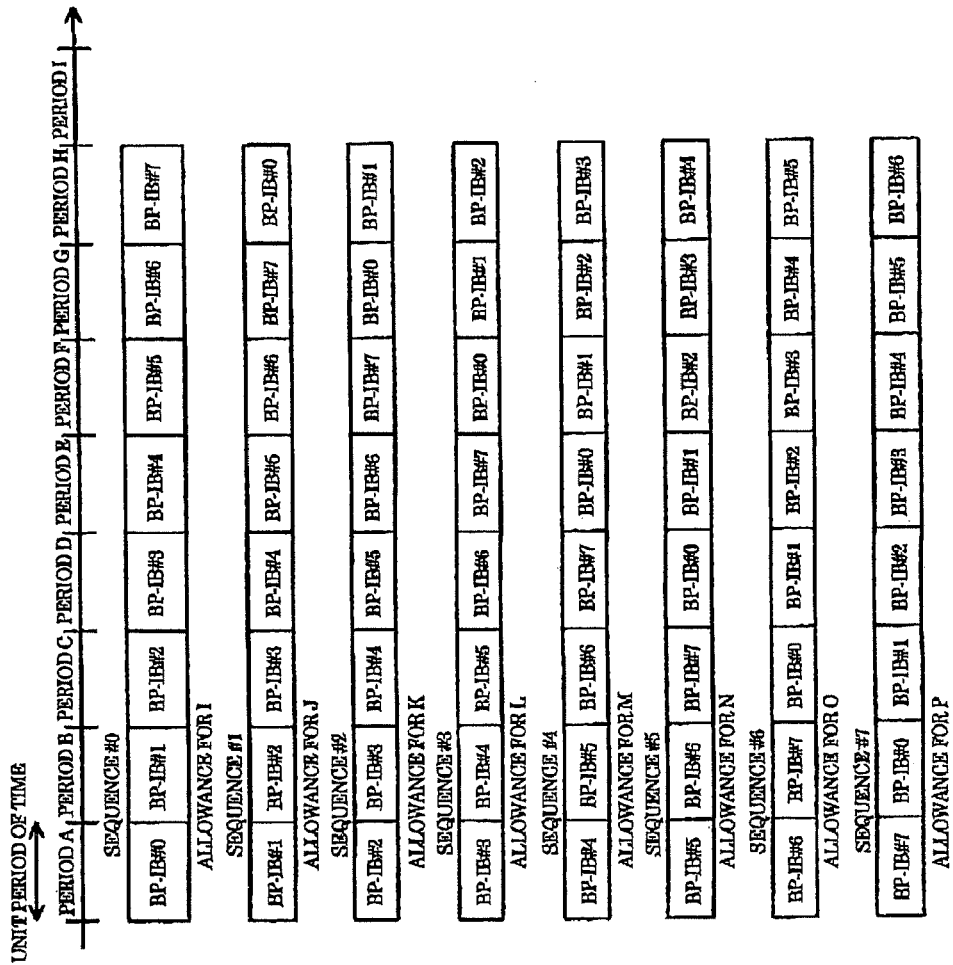
FIG. 8 is a timing chart showing a timing at which the input sequential arbitration is carried out in a packet exchanger having ports twice greater than ports in a packet exchanger in FIG. 6.

FIG. 8 is a timing chart showing a timing at which each of the sequences is carried out in a packet exchanger having ports in a doubled number for increasing a capacity.

If a packet exchanger is designed to have ports in a doubled number for increasing a capacity, the number of the basic processes to be carried out in each of the first to eighth sequences #0 to #7 would be doubled. However, by doubling the number of the sequences to be concurrently carried out in accordance with the first embodiment, a period of time during which the first to eighth sequences #0 to #7 are carried out are doubled, resulting in that a period of time necessary for carrying out the basic process remains a unit period of time. Thus, if a packet exchanger is designed to have ports in a doubled number for increasing a capacity, it would be possible to switch a packet at a maximum rate corresponding to a line rate.

In each of the first to eighth sequences #0 to #7, the basic processes are carried out in an order defined by the number of the input buffers. However, an input buffer for which the basic process is first carried out in one of the first to eighth sequences #0 to #7 is different from an input buffer for which the basic process is first carried out in the rest of the sequences.

Specifically, in the first sequence #0, the basic processes are carried out for the input buffer #0, the input buffer #1, the input buffer #2, the input buffer #3, the input buffer #4, the input buffer #5, the input buffer #6, and the input buffer #7 in this order.

In the second sequence #1, the basic processes are carried out for the input buffer #1, the input buffer #2, the input buffer #3, the input buffer #4, the input buffer #5, the input buffer #6, the input buffer #7, and the input buffer #0 in this order.

In the third sequence #2, the basic processes are carried out for the input buffer #2, the input buffer #3, the input buffer #4, the input buffer #5, the. input buffer #6, the input buffer #7, the input buffer #0, and the input buffer #1 in this order.

In the fourth sequence #3, the basic processes are carried out for the input buffer #3, the input buffer #4, the input buffer #5, the input buffer #6, the input buffer #7, the input buffer #0, the input buffer #1, and the input buffer #2 in this order.

In the fifth sequence #4, the basic processes are carried out for the input buffer #4, the input buffer #5, the input buffer #6, the input buffer #7, the input buffer #0, the input buffer #1, the input buffer #2, and the input buffer #3 in this order.

In the sixth sequence #5, the basic processes are carried out for the input buffer #5, the input buffer #6, the input buffer #7, the input buffer #0, the input buffer #1, the input buffer #2, the input buffer #3, and the input buffer #4 in this order.

In the seventh sequence #6, the basic processes are carried out for the input buffer #6, the input buffer #7, the input buffer #0, the input buffer #1, the input buffer #2, the input buffer #3, the input buffer #4, and the input buffer #5 in this order.

In the eighth sequence #7, the basic processes are carried out for the input buffer #7, the input buffer #0, the input buffer

1, the input buffer #2, the . input buffer #3, the input buffer #4, the input buffer #5, and the input buffer #6 in this order.

By differentiating an order in which the basic processes are carried out for the input buffers #0 to #7 in the first to eighth sequences #0 to #7, as mentioned above, the basic processes are carried out for different input buffers at the same period of time in the first to eighth sequences #0 to #7.

For instance, at the first period of time A, the basic processes. are carried out for the input buffers #0, #1, #2, #3, #4, #5, #6 and #7 in the first, second, third, fourth, fifth, sixth, seventh and eighth sequences #0, #1, #2, #3, #4, #5, #6 and #7, respectively.

Figure 9:
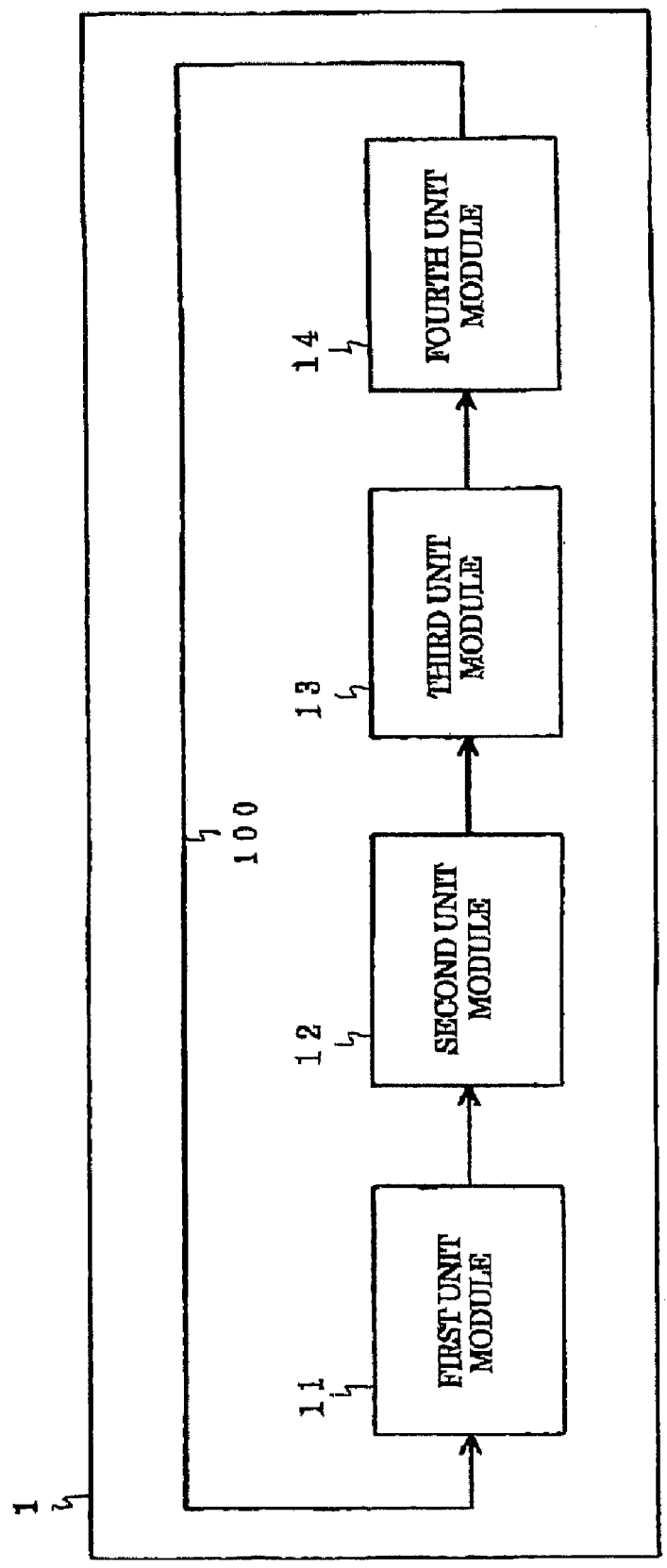
FIG. 9 is a block diagram of an arbiter circuit used in the first embodiment.

FIG. 9 is a block diagram of the arbiter circuit used in the first embodiment.

The arbiter circuit 1 is comprised of first to fourth unit modules 11, 12, 13 and 14 each associated with each of the first to fourth input buffers, and a signal line 100 connecting the first to fourth unit modules 11 to 14 to one another in a ring.

The arbiter circuit 1 carries out the input sequential arbitration. The first to fourth unit modules 11 to 14 receive an output request signal from the associated input buffers. The output request signal indicates how many cells the associated input buffer accumulates therein and further indicates which output port the cells are output therethrough.

By inputting a start signal to the first to fourth unit, modules 11 to 14 associated with the basic process to be first carried out in a sequence, the first to fourth unit modules 11 to 14 carry out the basic process to thereby determine an output port through which a packet is transmitted from the associated input buffers.

For instance, on receipt of the start signal, the first unit module 11 starts carrying out the basic process for the first input buffer #0. On receipt of the start signal, the second unit module 12 starts carrying out the basic process for the second input buffer #1. On receipt of the start signal, the third unit module 13 starts carrying out the basic process for the third input buffer #2. On receipt of the start signal, the fourth unit module 14 starts carrying out the basic process for the fourth input buffer #3.

After the basic process has been completed in each of the first to fourth unit modules 11 to 14, each of the first to fourth unit modules 11 to 14 transmits information relating to vacant output ports except an output port which has been selected by each of the first to fourth unit modules 11 to 14 and hence occupied by the input buffers, to the next stage unit module. Each of the next stage unit modules selects an output port through which a packet is transmitted from the associated input buffer, based on the information transmitted from the previous stage unit modules. A sequence is completed at the time when the information relating to the vacant output ports circles all around the first to fourth unit modules 11 to 14.

In accordance with a packet exchanger including the arbiter circuit 1 illustrated in FIG. 9, even if the number of ports is increased in the packet exchanger for increasing a capacity thereof, the number of the unit modules connected in a ring is merely increased, and each of the unit modules still carries out a single sequence in the same period of time. This ensures that it would not be necessary to increase a processing rate, even if a packet exchanger had an increased capacity due to an increase of ports in number.

FIGS. 10 to 14 illustrate an operation for selecting an output port through which a packet is transmitted. In FIGS. 10 to 14, it is assumed that the first to fourth unit modules 11 to 14 are associated with the first to fourth input buffers #0 to #3 (not illustrated).

In an initial condition, each of the first to fourth unit modules 11 to 14 stores the number of cells transmittable from the associated input buffers #0 to #3 for each of the output ports through which the cells are to be output.

Figure 11:
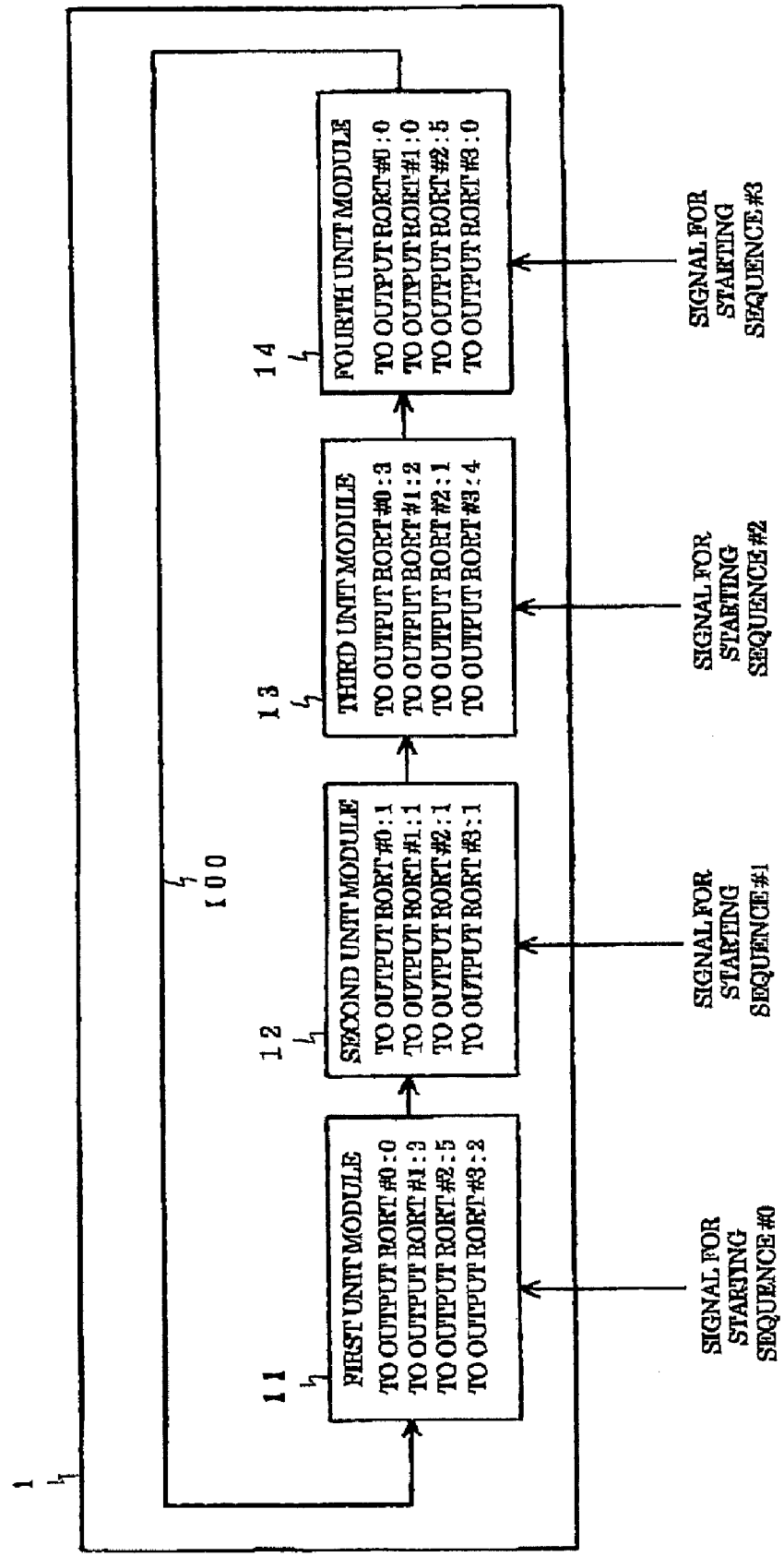
FIG. 11 is a block diagram of the arbiter circuit, showing an operation of determining an output port through which a packet is transmitted in the first embodiment.

For instance, as illustrated in FIG. 11, the first unit module 11 associated with the first input buffer #0 recognizes that the input buffer #0 stores no cell to be directed to a first output port #0, 3 cells to be directed to a second output port #1, 5 cells to be directed to a third output port #2, and 2 cells to be directed to a fourth output port #3.

Each of the first to fourth unit modules 11 to 14 receives information about the number of cells stored in the associated input buffer, from the associated input buffer together with an output request signal.

Figure 10:
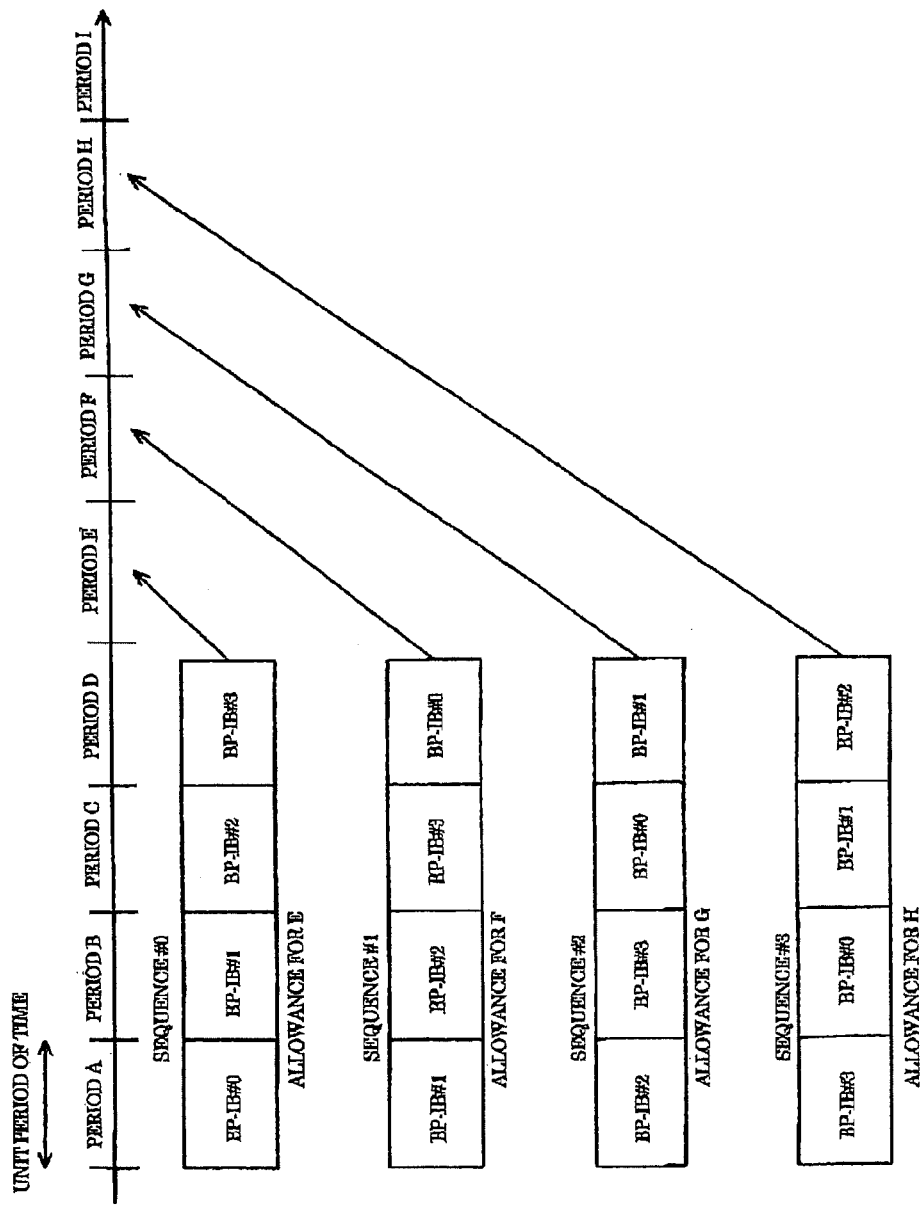
FIG. 10 is a chart showing an operation of determining an output port through which a packet is transmitted in the first embodiment.

With reference to FIG. 10, a time base is divided into a plurality of a unit period of times, each of which is identified with identifiers A to I.

In a first period of time A, the first to fourth sequences #0 to #3 concurrently start being carried out. In each of the first to fourth sequences #0 to #3, output ports to which packets are transmitted in fifth to eighth unit period of times E, F, G and H are determined.

In the first sequence #0, the basic processes are carried out for the first input buffer #0, the second input buffer #1, the third input buffer #2, and the fourth input buffer #3 in this order.

In the second sequence #1, the basic processes are carried out for the second input buffer #1, the third input buffer #2, the fourth input buffer #3, and the first input buffer #0 in this order.

In the third sequence #2, the basic processes are carried out for the third input buffer #2, the fourth input buffer #3, the first input buffer #0, and the second input buffer #1 in this order.

In the fourth sequence #3, the basic processes are carried out for the fourth input buffer #3, the first input buffer #0, the second input buffer #1, and the third input buffer #2 in this order.

As illustrated in FIG. 11, a sequence start signal is transmitted to the first unit module 11 in the first sequence #0, a sequence start signal is transmitted to the second unit module 12 in the second sequence #1, a sequence start signal is transmitted to the third unit module 13 in the third sequence #2, and a sequence start signal is transmitted to the fourth unit module 14 in the fourth sequence #3.

On receipt of the sequence start signal, each of the first to fourth unit modules #0 to #3 carries out the basic processes in each of the sequences #0 to #3.

In the embodiment, the first unit module 11 carries out the basic process for the first input buffer #0 in the sequence #0. At this stage, any output ports are not occupied by the input buffers in the sequences #0 to #3.

In the embodiment, it is assumed that the first module #0 gives an allowance to transmit a packet through an output port #1, to the first input buffer #0.

Figure 12:
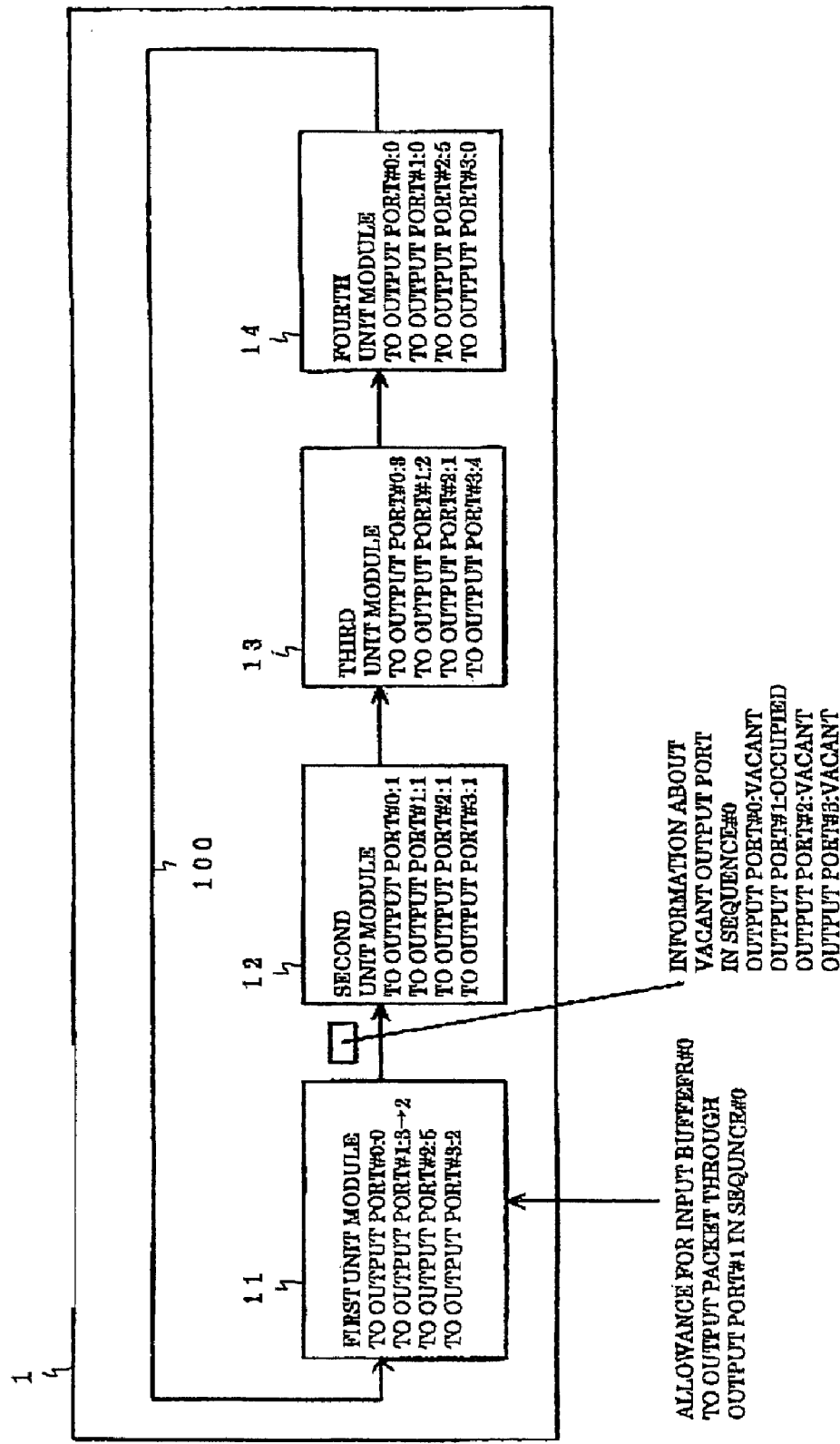
FIG. 12 is a block diagram of the arbiter circuit, showing an operation of determining an output port through which a packet is transmitted in the first embodiment.

As illustrated in FIG. 12, the first unit module 11 subtracts 1 from the number of cells accumulated in the first input buffer #0 and directed to the second output port #1. In addition, since the first unit module 11 has acquired the second output port #1 for the first input buffer #0 in the first sequence #0, the first unit module 11 informs the next stage unit module, that is, the second unit module 12 through the signal line 100 that only output ports #0, #2 and #3 are vacant in the first sequence #0.

The same operation as carried out in the first unit module 11 is carried out in the second to fourth unit modules 12 to 14 in different sequences.

For instance, on receipt of the sequence start signal, the second unit module 12 carries out the basic process for the second input buffer #1 in the sequence #1, the third unit module 13 carries out the basic process for the third input buffer #2 in the sequence #2, and the fourth unit module 14 carries out the basic process for the fourth input buffer #3 in the sequence #3. Then, after the basic processes have been completed, information relating to vacant output ports in each of the first to fourth sequences #0 to #3 is transmitted to the next unit module.

Based on the information relating to vacant output ports, transmitted 25 from the upstream unit module, each of the first to fourth unit modules #0 to #3 carries out the basic processes for the associated input buffers.

Figure 13:
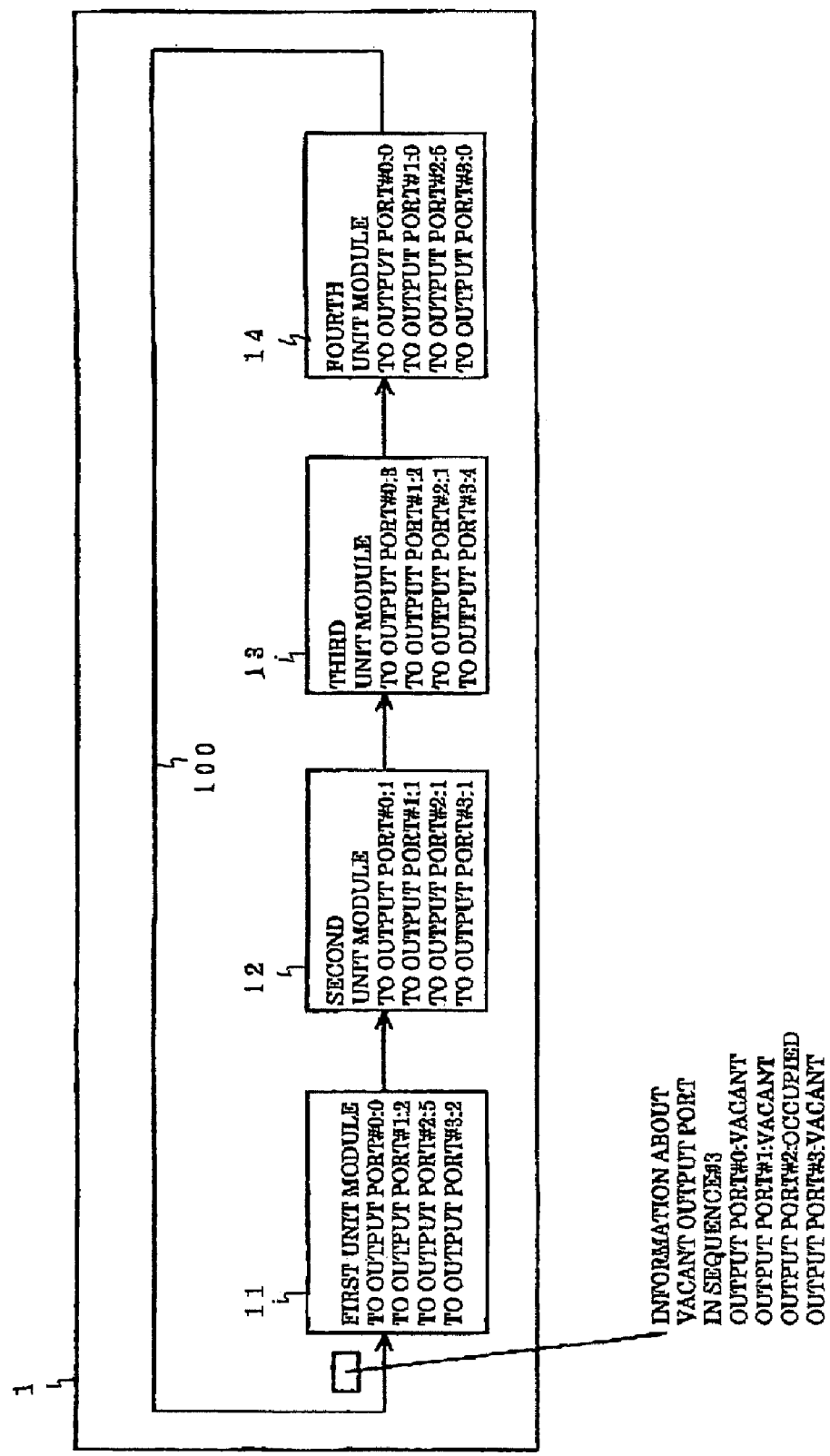
FIG. 13 is a block diagram of the arbiter circuit, showing an operation of determining an output port through which a packet is transmitted in the first embodiment.

For instance, as illustrated in FIG. 13, the first unit module 11 carries out the basic process to thereby determine an output port through which a packet transmitted from the first input buffer #0 is transmitted, based on information 101 relating to vacant output ports for the sequence #3, transmitted from the upstream unit module or the fourth unit module 13. The information 101 indicates that the first, second and fourth output ports #0, #1 and #3 are vacant, and the third output port #2 is occupied by the input buffers.

In the basic process, the first unit module 11 determines that the first input buffer #0 transmits a packet through the fourth output port #3 in the sequence #3. Each of the first to fourth unit modules #0 to #3 may determine that the same input buffer transmits a packet through the same output port in each of the sequences concurrently carried out, because packets are to be transmitted in different period of times in each of the sequences.

What is prohibited is that an allowance to transmit a packet through a certain output port in the same sequence is made to a plurality of the input buffers.

Figure 14:
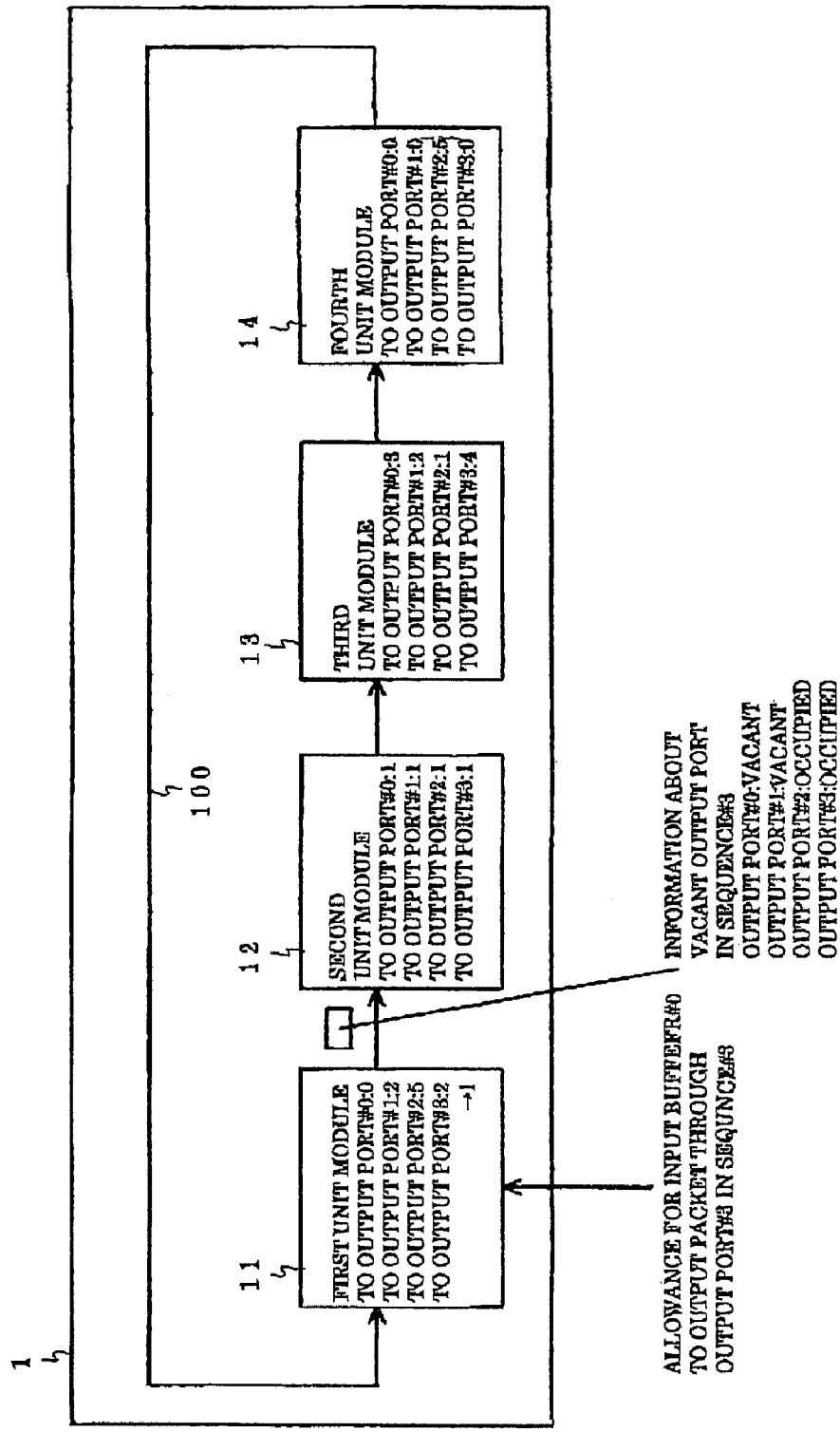
FIG. 14 is a block diagram of the arbiter circuit, showing an operation of determining an output port through which a packet is transmitted in the first embodiment.

For instance, with reference to FIG. 14, the second unit module 12 is not allowed to determine that both the first and second input buffers #0 and #1 transmit a packet through the second output port #1 in the sequence #3, even if the second output port #1 is vacant.

Repeating the above-mentioned operation, each of the sequences is finished at the time when the information relating to vacant output ports passes through the first to fourth unit modules 11 to 14.

For instance, when information relating to vacant output ports for the sequence #0, transmitted from the first unit module 11, arrives at the fourth unit module 13, the first sequence #0 is finished.

Since the first to fourth unit modules 11 to 14 start the basic process at the different sequences from one another, the first to fourth unit modules 11 to 14 finish the basic process at the different sequences from one another. Each of the first to fourth unit modules 11 to 14 stores which output port an allowance to transmit a packet therethrough is made for the associated input buffer in each of the sequences #0 to #3 until the sequences #0 to #3 are finished, and transmits an output allowance signal indicative of an output port to which the above-mentioned allowance is made, to the input buffers #0 to #3 when the sequences #0 to #3 have been finished.

The output allowance signal is transmitted further to a packet switch (not illustrated). In each of the sequences #0 to #3, each of the input buffers #0 to #3 outputs a cell to the allowed output port at a period of time associated with the sequences #0 to #3. The packet switch switches a packet between the input buffers #0 to #3 and the output ports at a period of time associated with the sequences #0 to #3.

After the first to fourth sequences #0 to #3 have been finished, the fifth to eighth sequences #4 to #7 are carried out for making an allowance to transmit a packet at each of period of times I, J, K and L. The same operation as mentioned above is repeated.

Figure 15:
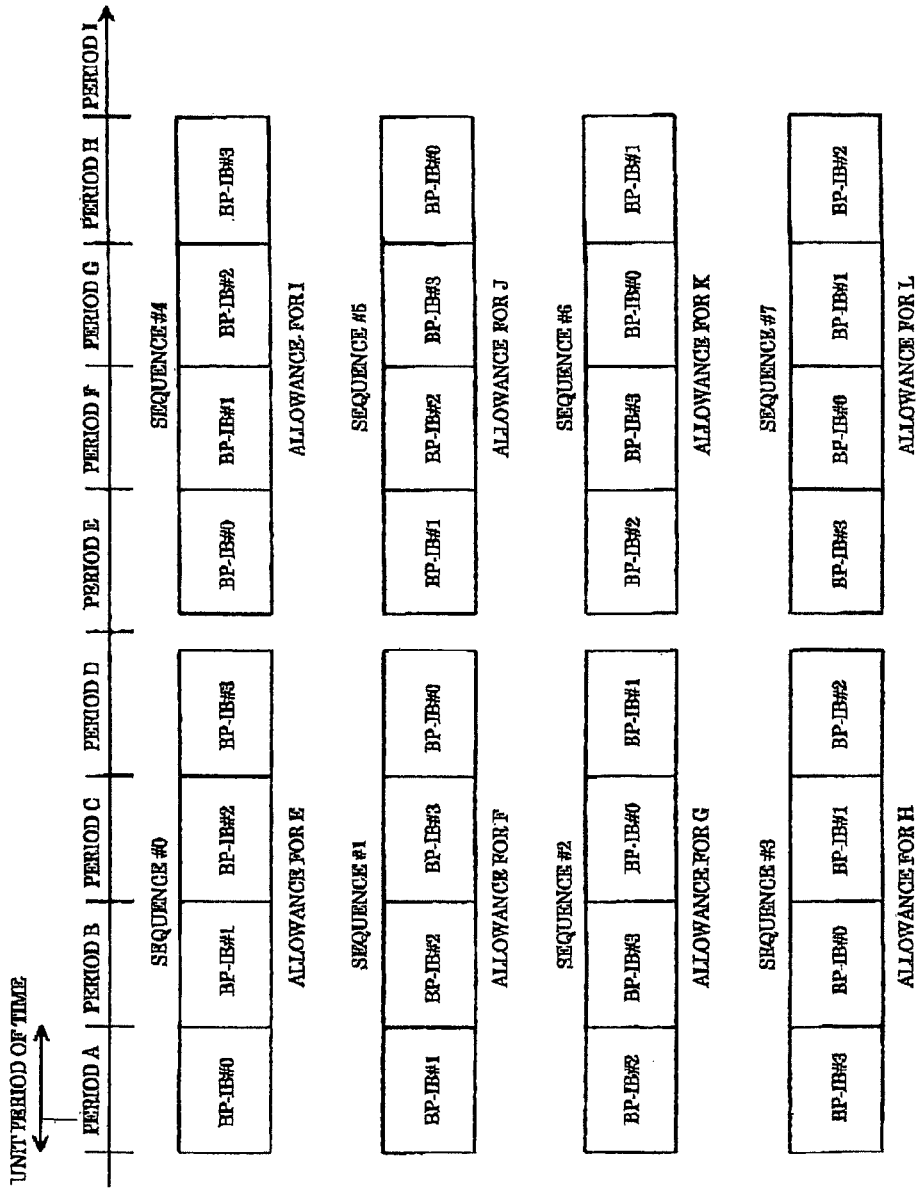
FIG. 15 is a timing chart showing a timing at which the output sequential arbitration is carried out in the first embodiment.

FIG. 15 is a timing chart showing a timing at which each of sequences is carried out in the output sequential arbitration in the method of carrying out arbitration in a packet exchanger, in accordance with the first embodiment.

It is assumed that a packet exchanger has four input and output ports.

In the first embodiment, four sequences equal in number to the input and output ports are concurrently carried out. In each of the sequences, an allowance to transmit a packet at different times is made. For instance, an allowance to transmit, a packet at a time E is made in a first sequence #0, an allowance to transmit a packet at a time F is made in a second sequence #1, an allowance to transmit a packet at a time G is made in a third sequence #2, and an allowance to transmit a packet at a time H is made in a fourth sequence #3.

After the first to fourth sequences #0 to #3 have been completed, next four sequences #4 to #7 concurrently start being carried out. An allowance to transmit a packet at a time I is made in a fifth sequence #4, an allowance to transmit a packet at a time J is made in a sixth sequence #5, an allowance to transmit a packet at a time K is made in a seventh sequence #6, and an allowance to transmit a packet at a time L is made in a eighth sequence #7.

Since allowances to transmit a packet at successive time are made in the first to eighth sequences #0 to #7, even if each of the first to eighth sequences #0 to #7 take a time four times greater than a unit period of time for being completed, it would be possible to transmit a packet at a maximum rate corresponding to a line rate.

In the first sequence #0, the basic process for an input buffer #0 is first carried out, and then, the basic process for an input buffer #1 is carried out. Subsequently, the basic process for an input buffer #2 is first carried out, and then, the basic process for an input buffer #3 is carried out. Since each of the first to fourth sequences #1 to #4 may be completed within a period of time equal to a unit period of time multiplied by 4, each of the basic processes may be completed within a unit period of time.

Similarly to the first sequence #0, in the second sequence #1, the basic process for an input buffer #1 is first carried out, and then, the basic process for an input buffer #2 is carried out. Subsequently, the basic process for an input buffer #3 is first carried out, and then, the basic process for an input buffer #0 is carried out.

In the third sequence #2, the basic process for an input buffer #2 is first carried out, and then, the basic process for an input buffer #3 is carried out. Subsequently, the basic process for an input buffer #0 is first carried out, and then, the basic process for an input buffer #1 is carried out.

In the fourth sequence #3, the basic process for an input buffer #3 is first carried out, and then, the basic process for an input buffer #0 is carried out. Subsequently, the basic process for an input buffer #1 is first carried out, and then, the basic process for an input buffer #2 is carried out.

As illustrated in FIG. 6, after the first to fourth sequences #0 to #3 have been completed, the fifth to eighth sequences #4 to #7 are concurrently carried out.

In the fifth sequence #4, the basic process for an input buffer #0 is first carried out, and then, the basic process for an input buffer #1 is carried out. Subsequently, the basic process for an input buffer #2 is first carried out, and then, the basic process for an input buffer #3 is carried out.

In the sixth sequence #5, the basic process for an input buffer #1 is first carried out, and then, the basic process for an input buffer #2 is carried out. Subsequently, the basic process for an input buffer #3 is first carried out, and then, the basic process for an input buffer #0 is carried out.

In the seventh sequence #6, the basic process for an input buffer #2 is first carried out, and then, the basic process for an input buffer #3 is carried out. Subsequently, the basic process for an input buffer #0, is first carried out, and then, the basic process for an input buffer #1 is carried out.

In the eighth sequence #7, the basic process for an input buffer #3 is first carried out, and then, the basic process for an input buffer #0 is carried out. Subsequently, the basic process for an input buffer #1 is first carried out, and then, the basic process for an input buffer #2 is carried out.

Figure 16:
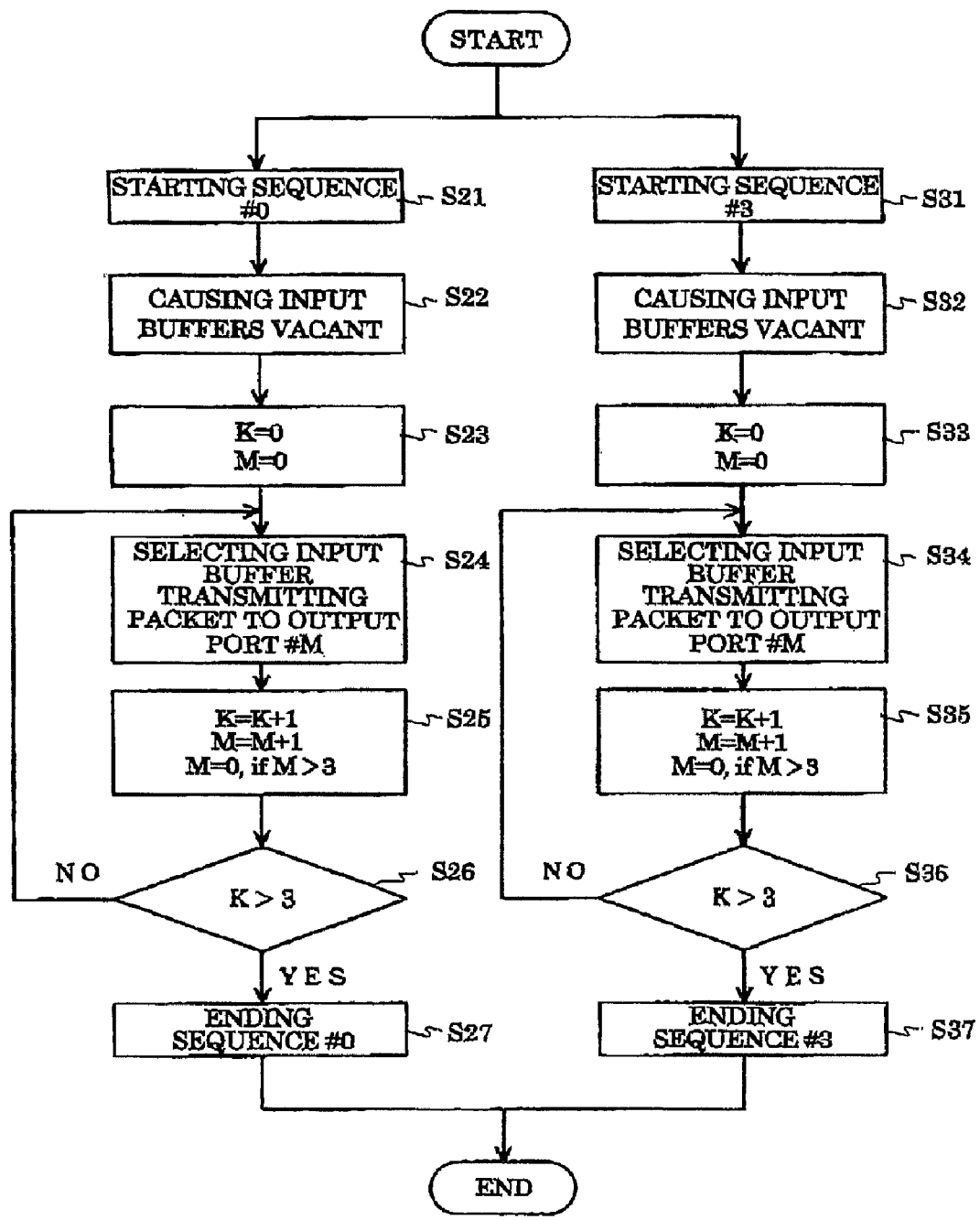
FIG. 16 is a flow-chart showing an operation of the output sequential arbitration in the first embodiment.

FIG. 16 is a flowchart showing an operation of sequences in the output sequential arbitration in the first embodiment. In FIG. 7, the sequences are carried out in parallel or independently of each other.

For instance, when the first sequence #0 starts being carried out in step S21, all input buffers are caused vacant in step S22.

Then, a variable K is substituted by 0 and a variable M is substituted by 0 both in step S23.

Then, an input buffer to which an allowance to transmit a packet to an output port #M is to be made is selected among vacant input buffers in step S24.

Thereafter, 1 is added to the variable K in step S25. In addition, 1 is added to the variable M, and if the variable M is greater than 3 (M>3), the variable M is substituted by 0 in step S25.

Then, the variable K is judged whether greater than 3 (K>3) in step S26. If the variable K is not greater than 3 (NO in step S26), the steps S24 to S26 are repeated. If the variable K is greater than 3 (YES in step S26), the first sequence #0 is finished in step S27.

Similarly to the first sequence #0, when the fourth sequence #3 starts being carried out in step S31, all input buffers are caused vacant in step S32, Then, a variable K is substituted by 0 and a variable M is substituted by 0 both in step S33.

Then, an input buffer to which an allowance to transmit a packet to an output port #M is to be made is selected among vacant input buffers in step S34.

Thereafter, 1 is added to the variable K in step S35. In addition, 1 is added to the variable M, and if the variable M is greater than 3 (M>3), the variable M is substituted by 0 in step S35.

Then, the variable K is judged whether greater than 3 (K>3) in step S36. If the variable K is not greater than 3 (NO in step S36), the steps S34 to S36 are repeated. If the variable K is greater than 3 (YES in step S36), the fourth sequence #3 is finished in step S37.

Though the second and third sequences #1 and #2 are not illustrated in FIG. 16, they are carried out in a similar manner to the first and fourth sequences #0 and #3.

Figure 17:
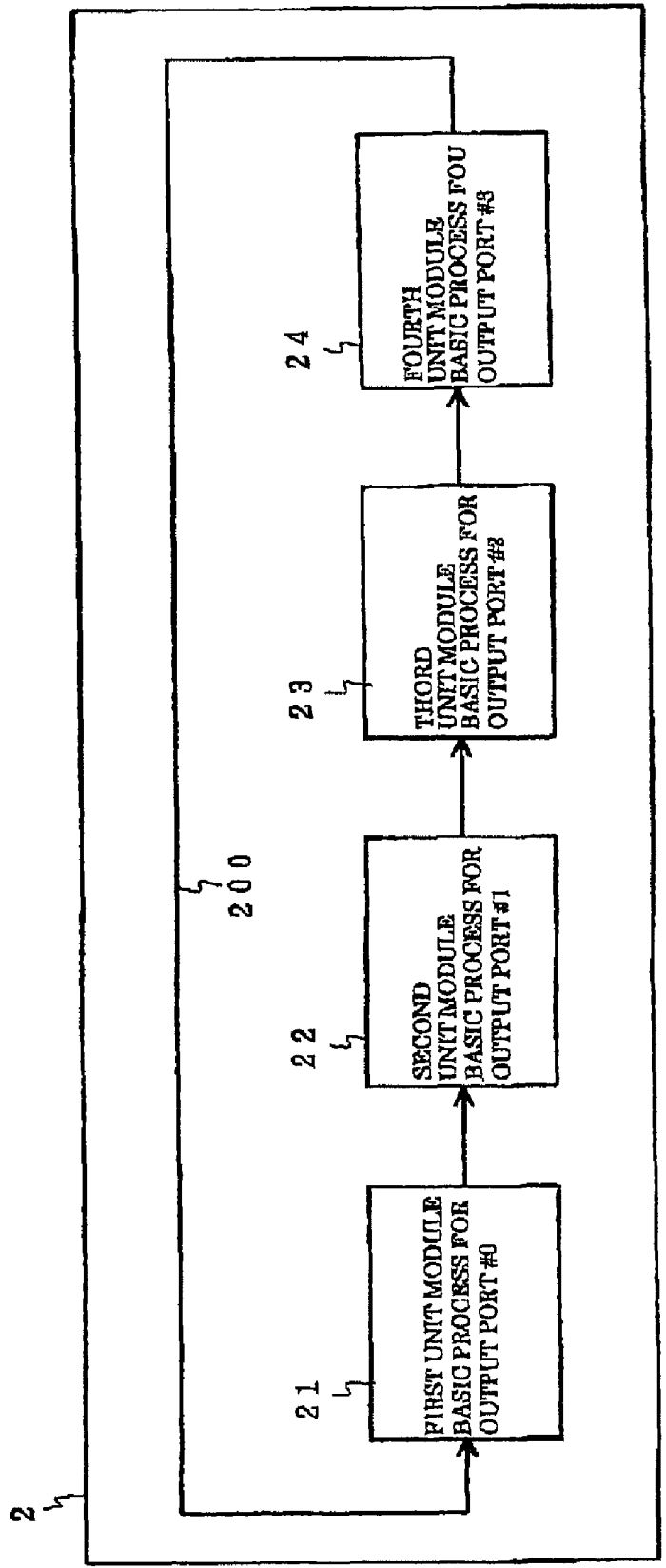
FIG. 17 is a block diagram of an arbiter circuit used in the first embodiment.

FIG. 17 is a block diagram of the arbiter circuit used in the first embodiment.

The arbiter circuit 1 is comprised of first to fourth unit modules 21, 22, 23 and 24 each associated with each of the first to fourth output ports, and a signal line 200 connecting the first to fourth unit modules 21 to 24 to one another in a ring.

The arbiter circuit 1 carries out the output sequential arbitration. Each of the first to fourth unit modules 21 to 24 carries out the basic process for selecting an input buffer in association with an output port. The basic process is carried out in each of the first to fourth unit modules 21 to 24 at the same timing as the basic processes carried out in the above-mentioned input sequential arbitration, ensuring the same advantages as the advantages obtained in the basic process in the input sequential arbitration.

Figure 18:
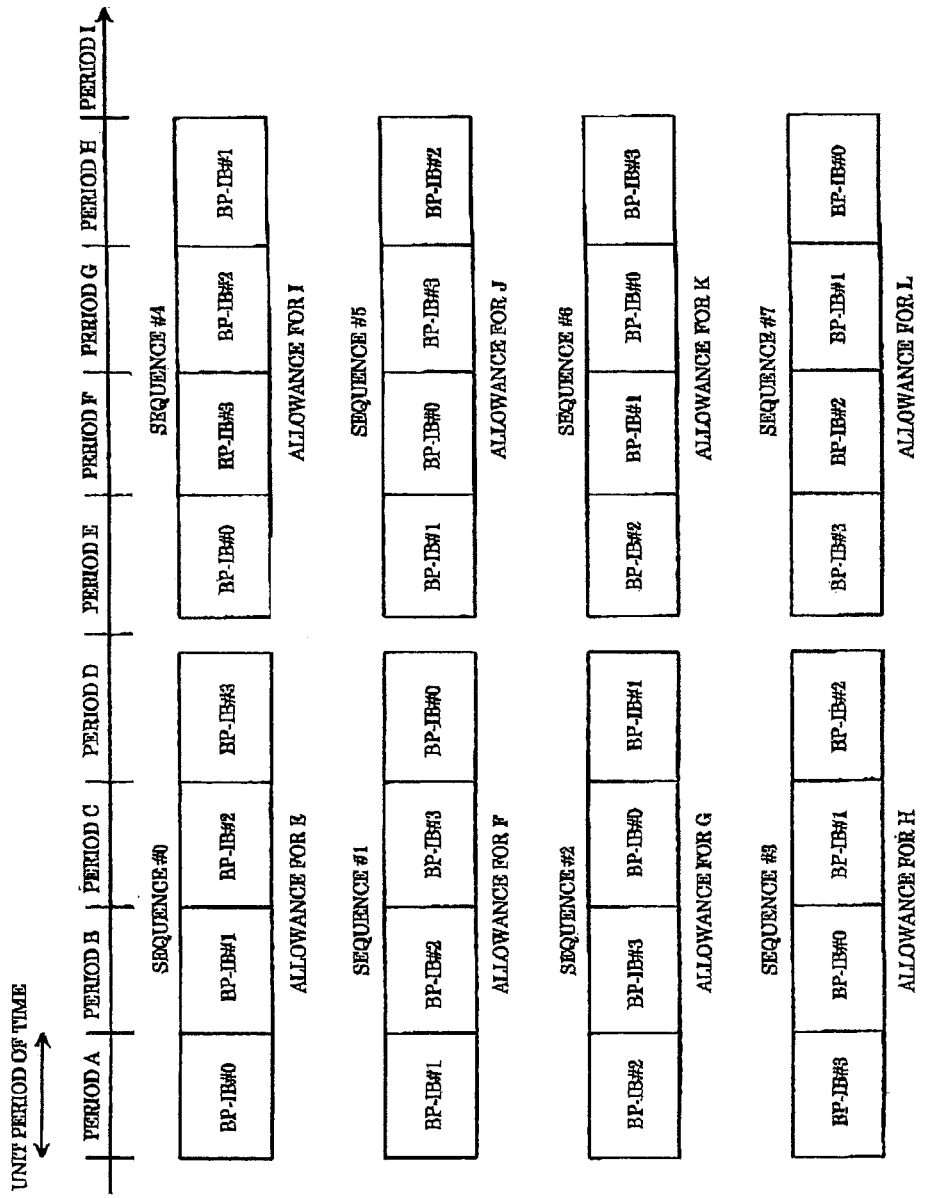
FIG. 18 is a timing chart showing a timing at which input sequential arbitration is carried out in accordance with the second embodiment.

FIG. 18 is a timing chart showing a timing at which each of sequences is carried out in the input sequential arbitration in the method of carrying out arbitration in a packet exchanger, in accordance with the second embodiment.

In the second embodiment, after a first sequence has been completed, a second sequence is carried out. In the second sequence, the basic processes are carried out in an order just opposite to an order in which the basic processes are carried out in the first sequence.

For instance, in the first sequence #0, the basic processes are carried out for the input buffers #0, #1, #2 and #3 in this order. In contrast, in the fifth sequence #4 carried out just after the first sequence #0, the basic processes are carried out in an order opposite to the order in the first sequence #0. Specifically, the basic processes are carried out for the input buffers #0, #3, #2 and #1 in this order.

This arrangement prevents input buffers having a smaller number from preferentially acquiring an allowance to output a packet, ensuring equal opportunity to the input buffers to acquire an allowance to output a packet.

Similarly to the first sequence #0, in the second sequence #1, the basic processes are carried out for the input buffers #1, #2, #3 and #0 in this order. In contrast, in the sixth sequence #5 carried out just after the second sequence #1, the basic processes are carried out for the input buffers #1, #0, #3 and #2 in this order.

In the third sequence #2, the basic processes are carried out for the input buffers #2, #3, #0 and #1 in this order. In contrast, in the seventh sequence #6 carried out just after the third sequence #2, the basic processes are carried out for the input buffers #2, #1, #0 and #3 in this order.

In the fourth sequence #3, the basic processes are carried out for the input buffers #3, #0, #1 and #2 in this order. In contrast, in the eighth sequence #7 carried out just after the fourth sequence #3, the basic processes are carried out for the input buffers #3, #2, #1 and #0 in this order.

The output buffer sequential arbitration may be defined similarly to the above-mentioned input sequential arbitration, ensuring the same advantages as the advantages obtained by the input sequential arbitration.

Figure 19:
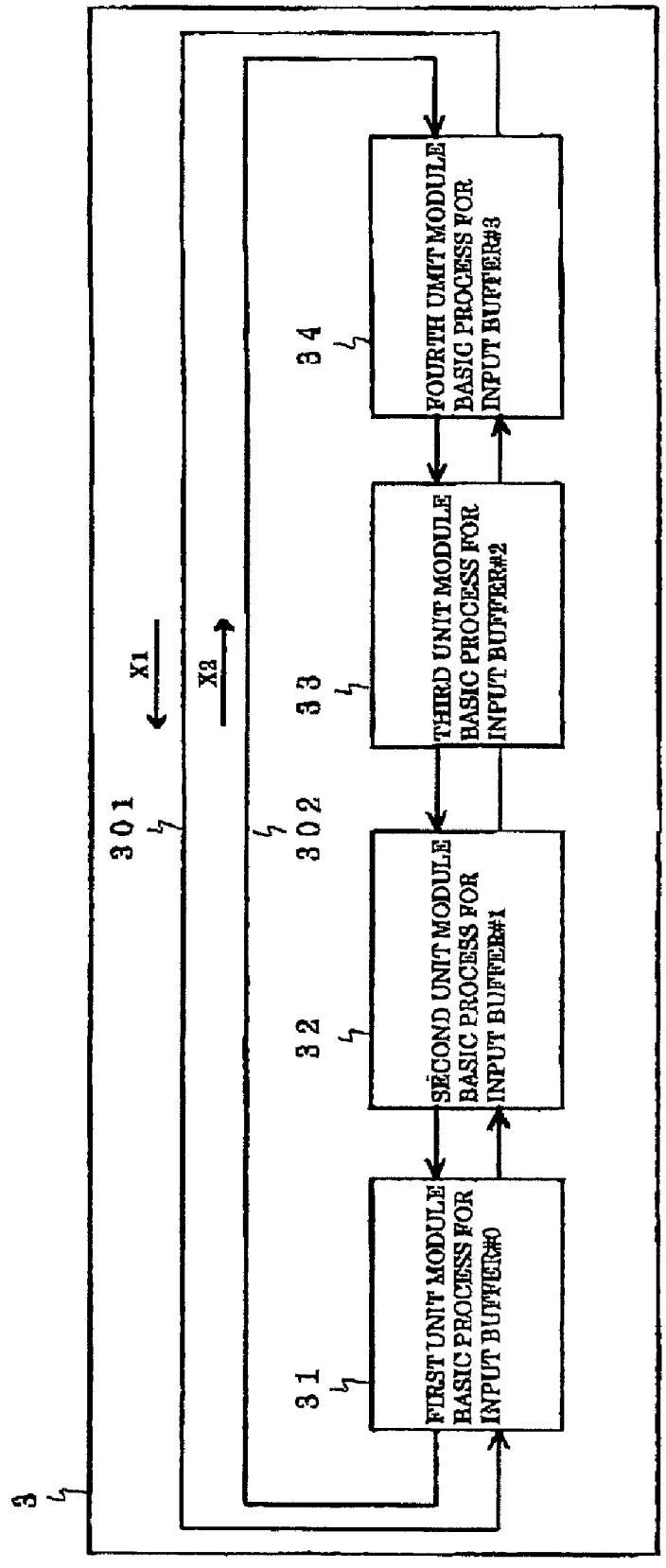
FIG. 19 is a block diagram of an arbiter circuit used in the second embodiment.

FIG. 19 is a block diagram of an arbiter circuit used in the second embodiment.

The illustrated arbiter circuit 3 is comprised of first to fourth unit modules 31 to 34 each carrying the said basic processes, a first signal line 301 connecting the first to fourth unit modules 31 to 34 to one another in a ring, and a second signal line 302 connecting the first to fourth unit modules 31 to 34 to one another in a ring.

A signal is transmitted through the first signal line 301 in a first direction indicated with an arrow X1, and in contrast, a signal is transmitted through the second signal line 302 in a second direction opposite to the first direction, that is, in a direction indicated with an arrow X2.

When the basic processes are carried out in a forward order as the basic processes carried out in the first to fourth sequences #0 to #3, a signal is circulated through the first to fourth unit modules 31 to 34 through the first signal line 301. In contrast, when the basic processes are carried out in a reverse order as the basic processes carried out in the fifth to eighth sequences #4 to #7, a signal is circulated through the fourth to first unit modules 34 to 31 through the second signal line 302.

Figure 20:
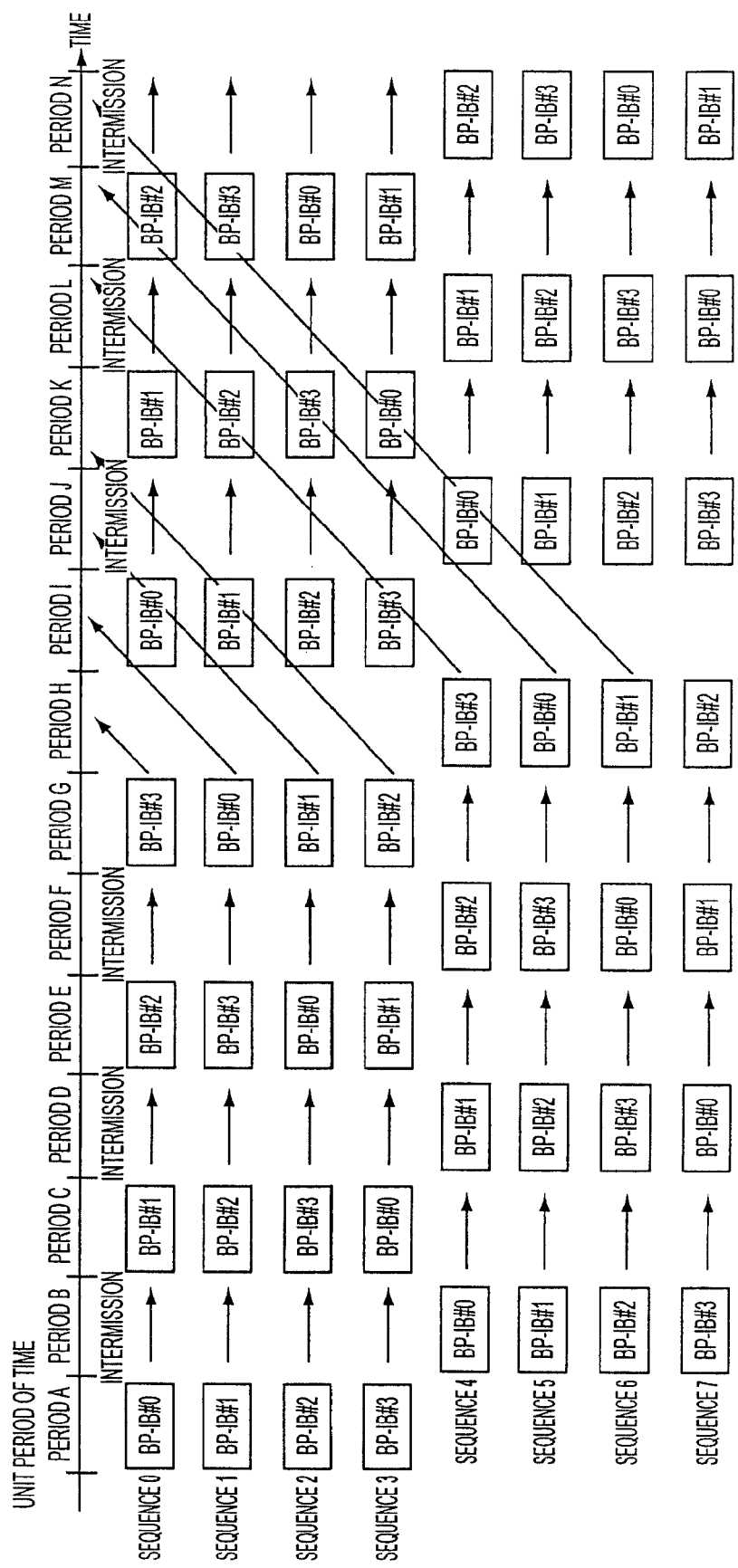
FIG. 20 is a timing chart showing a timing at which input sequential arbitration is carried out in accordance with the third embodiment.

FIG. 20 is a timing chart showing a timing at which each of sequences is carried out in the input sequential arbitration in the method of carrying out arbitration in a packet exchanger, in accordance with the third embodiment.

In the third embodiment, the sequences #0 to #7 are grouped into a first group including the sequences #0 to #3 and a second group including the sequences #4 to #7, and an intermission is arranged between the first and second groups.

Specifically, the sequences #0 to #3 are first concurrently carried out. Then, after a unit period of time has been passed, the sequences #4 to #7 are concurrently carried out. In the sequences #0 to #7, an allowance to transmit a packet at different time is made.

In accordance with the third embodiment, a signal indicative of information relating to vacant output ports can be transmitted through the first to fourth unit modules 31 to 34 in a unit period of time as an intermission.

In the third embodiment, though a sequence takes time twice greater than the sequence carried out in the first embodiment, it would be possible to transmit a packet at a maximum rate corresponding to a line rate merely by doubling the number of sequences to be concurrently carried out.

The output buffer sequential arbitration may be defined similarly to the above-mentioned input sequential arbitration, ensuring the same advantages as the advantages obtained by the input sequential arbitration.

Figure 21:
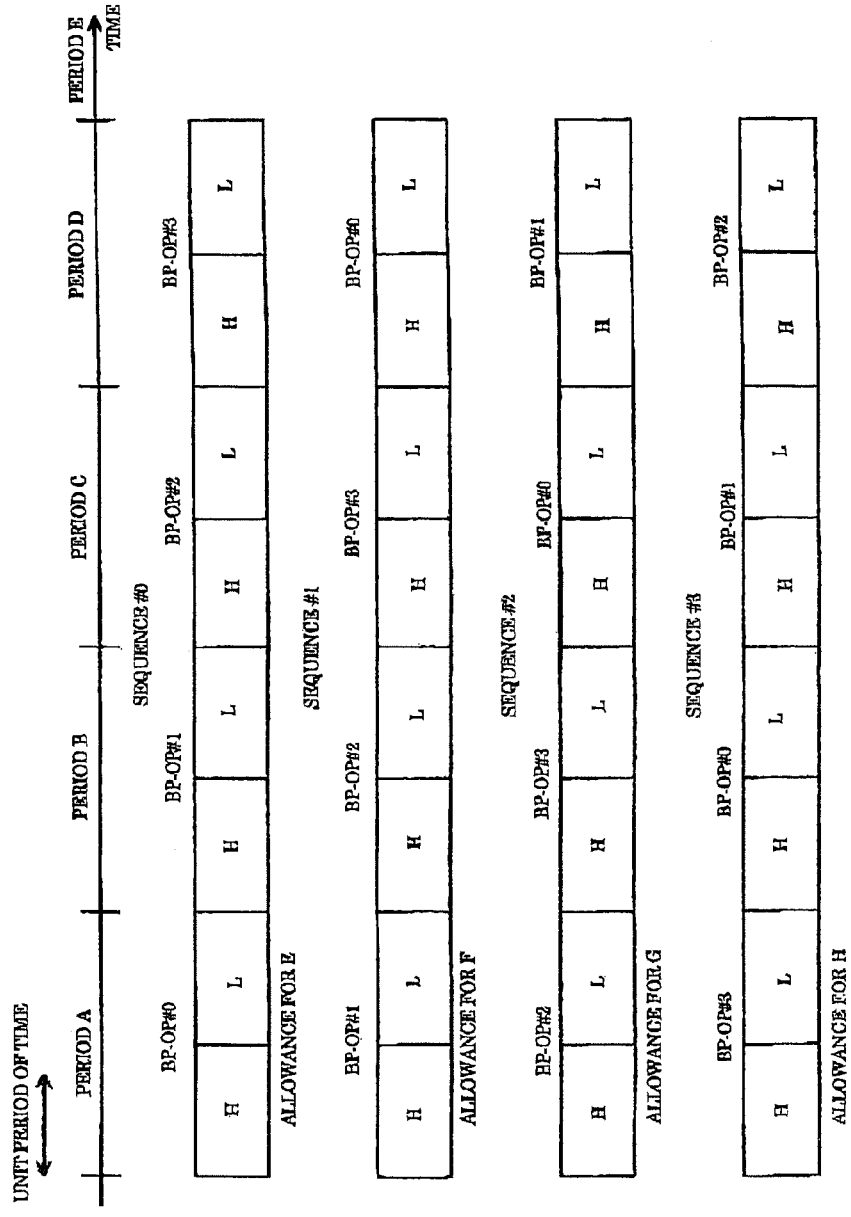
FIG. 21 is a timing chart showing a timing at which output sequential arbitration is carried out in accordance with the fourth embodiment.

FIG. 21 is a timing chart showing a timing at which each of sequences is carried out in the output sequential arbitration in the method of carrying out arbitration in a packet exchanger, in accordance with the fourth embodiment.

In the fourth embodiment, cells are grouped into first cells having a higher priority and second cells having a lower priority. In addition, the basic process to be carried out for each of output ports in each of the first to fourth sequences #0 to #3 is divided into first and second processes, and each of the first to fourth unit modules stores the number of first and second cells for the associated output port.

In a first half in the basic process, an input buffer to which an allowance to transmit a packet through the associated output port is made is selected among input buffers accumulating the first cells. If such an allowance cannot be made to any one of the input buffers, an input buffer to which an allowance to transmit a packet through the associated output port is made is selected among input buffers accumulating the second cells.

For instance, as illustrated in FIG. 21, the basic processes are carried out in the following order in the first sequence #0.

(A) the basic process for selecting an input buffer to which an allowance to transmit a packet through the output port #0 is made, among input buffers accumulating the first cells.

(B) the basic process for selecting an input buffer to which an allowance to transmit a packet through the output port #0 is made, among input buffers accumulating the second cells.

(C) the basic process for selecting an input buffer to which an allowance to transmit a packet through the output port #1 is made, among input buffers accumulating the first cells.

(D) the basic process for selecting an input buffer to which an allowance to transmit a packet through the output port #1 is made, among input buffers accumulating the second cells.

(E) the basic process for selecting an input buffer to which an allowance to transmit a packet through the output port #2 is made, among input buffers accumulating the first cells.

(F) the basic process for selecting an input buffer to which an allowance to transmit a packet through the output port #2 is made, among input buffers accumulating the second cells.

(G) the basic process for selecting an input buffer to which an allowance to transmit a packet through the output port #3 is made, among input buffers accumulating the first cells.

(H) the basic process for selecting an input buffer to which an allowance to transmit a packet through the output port #3 is made, among input buffers accumulating the second cells.

The basic processes are carried out in the following order in the second sequence #1.

(A) the basic process for selecting an input buffer to which an allowance to transmit a packet through the output port #1 is made, among input buffers accumulating the first cells.

(B) the basic process for selecting an input buffer to which an allowance to transmit a packet through the output port #1 is made, among input buffers accumulating the second cells.

(C) the basic process for selecting an input buffer to which an allowance to transmit a packet through the output port #2 is made, among input buffers accumulating the first cells.

(D) the basic process for selecting an input buffer to which an allowance to transmit a packet through the output port #2 is made, among input buffers accumulating the second cells.

(E) the basic process for selecting an input buffer to which an allowance to transmit a packet through the output port. #3 is made, among input buffers accumulating the first cells.

(F) the basic process for selecting an input buffer to which an allowance to transmit a packet through the output port #3 is made, among input buffers accumulating the second cells.

(G) the basic process for selecting an input buffer to which an allowance to transmit a packet through the output port #0 is made, among input buffers accumulating the first cells.

(H) the basic process for selecting an input buffer to which an allowance to transmit a packet through the output port #0 is made, among input buffers accumulating the second cells.

The basic processes are carried out in the following order in the third sequence #2.

(A) the basic process for selecting an input buffer to which an allowance to transmit a packet through the output port #2 is made, among input buffers accumulating the first cells.

(B) the basic process for selecting an input buffer to which an allowance to transmit a packet through the output port #2 is made, among input buffers accumulating the second cells.

(C) the basic process for selecting an input buffer to which an allowance to transmit a packet through the output port #3 is made, among input buffers accumulating the first cells.

(D) the basic process for selecting an input buffer to which an allowance to transmit a packet through the output port #3 is made, among input buffers accumulating the second cells.

(E) the basic process for selecting an input buffer to which an allowance to transmit a packet through the output port #0 is made, among input buffers accumulating the first cells.

(F) the basic process for selecting an input buffer to which an allowance to transmit a packet through the output port #0 is made, among input buffers accumulating the second cells.

(G) the basic process for selecting an input buffer to which an allowance to transmit a packet through the output port #1 is made, among input buffers accumulating the first cells.

(H) the basic process for selecting an input buffer to which an allowance to transmit a packet through the output port #1 is made, among input buffers accumulating the second cells.

The basic processes are carried out in the following order in the fourth sequence #3.

(A) the basic process for selecting an input buffer to which an allowance to transmit a packet through the output port #3 is made, among input buffers accumulating the first cells.

(B) the basic process for selecting an input buffer to which an allowance to transmit a packet through the output port #3 is made, among input buffers accumulating the second cells.

(C) the basic process for selecting an input buffer to which an allowance to transmit a packet through the output port #0 is made, among input buffers accumulating the first cells.

(D) the basic process for selecting an input buffer to which an allowance to transmit a packet through the output port #0 is made, among input buffers accumulating the second cells.

(E) the basic process for selecting an input buffer to which an allowance to transmit a packet through the output port #1 is made, among input buffers accumulating the first cells.

(F) the basic process for selecting an input buffer to which an allowance to transmit a packet through the output port #1 is made, among input buffers accumulating the second cells.

(G) the basic process for selecting an input buffer to which an allowance to transmit a packet through the output port #2 is made, among input buffers accumulating the first cells.

(H) the basic process for selecting an input buffer to which an allowance to transmit a packet through the output port #2 is made, among input buffers accumulating the second cells.

In accordance with the fourth embodiment, even if the first and second cells accumulated in different input buffers are addressed to the same output port, an allowance to be output to the output port is certainly preferentially given to the first cells having a priority preferential to a priority of the second cells.

Figure 22:
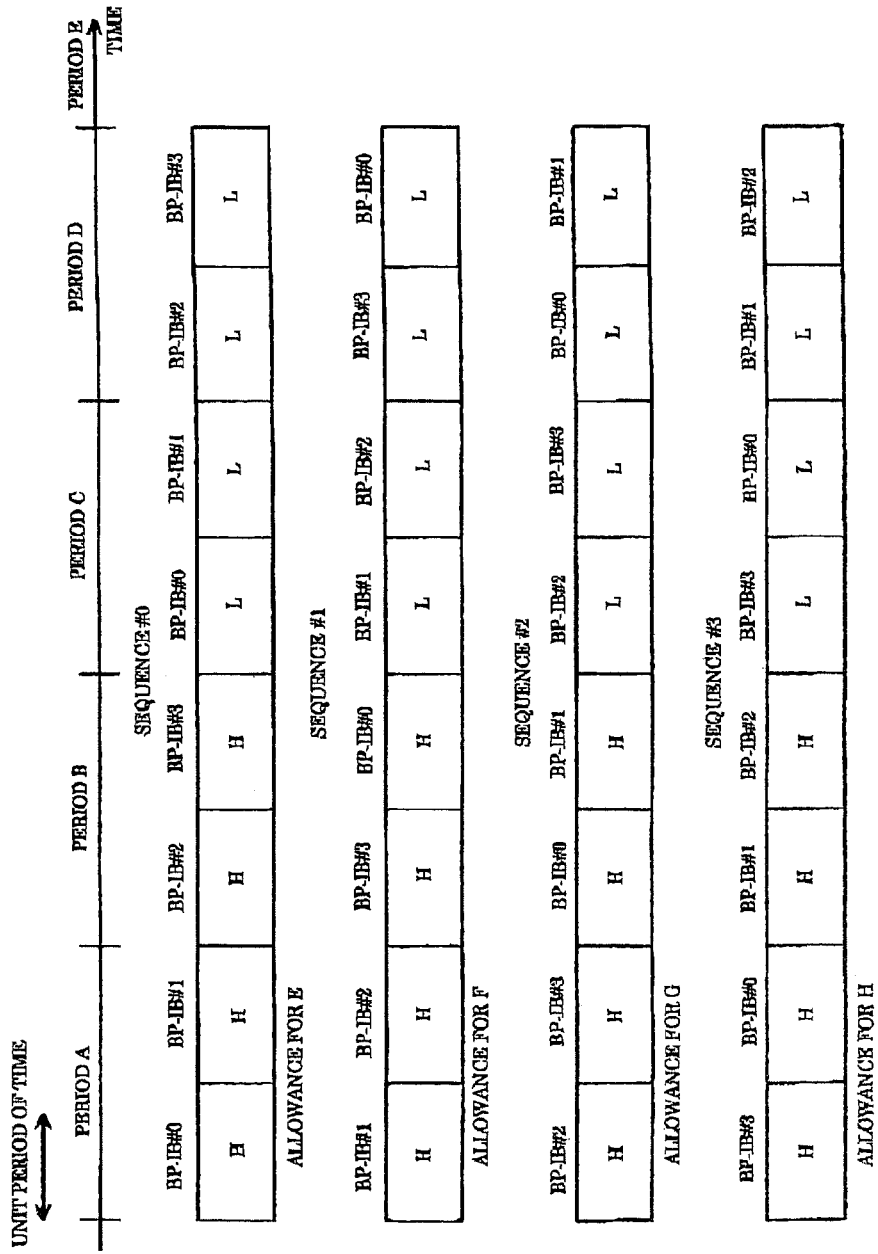
FIG. 22 is a timing chart showing a timing at which input sequential arbitration is carried out in accordance with the fifth embodiment.

FIG. 22 is a timing chart showing a timing at which each of sequences is carried out in the input sequential arbitration in the method of carrying out arbitration in a packet exchanger, in accordance with the fifth embodiment.

In the fifth embodiment, the basic processes are carried out for all of the input buffers with respect to packets having a higher priority, and then, the basic processes are carried out for all of the input buffers with respect to packets having a lower priority.

In the basic processes carried out with respect to packets having a higher priority, a search is made as to whether there is an output port which can transmit a packet having a higher priority therethrough, and if such an output port is found, an allowance to transmit a packet is made to the output port.

In the fifth embodiment, the basic process is carried out in a half of a unit period of time relative to a basic process carried out with respect to packets, having no priority.

Accordingly, the first to fourth sequences #1 to #3 take the same period of time to be carried out as a period of time necessary for the sequences #0 to #7 in the second embodiment (see FIG. 18) to be carried out. Thus, it is possible to transmit a packet at a maximum rate corresponding to a line rate, even if the number of sequences to be concurrently carried out is not increased.

In the first sequence #0, the basic processes are carried out for the input buffers in the following order.

(A) the basic process for the first input buffer #0 with respect to packets having a higher priority.

(B) the basic process for the second input buffer #1 with respect to packets having a higher priority.

(C) the basic process for the third input buffer #2 with respect to packets having a higher priority.

(D) the basic process for the fourth input buffer #3 with respect to packets having a higher priority.

(E) the basic process for the first input buffer #0 with respect to packets having a lower priority.

(F) the basic process for the second input buffer #1 with respect to packets having a lower priority.

(G) the basic process for the third input buffer #2 with respect to packets having a lower priority.

(H) the basic process for the fourth input buffer #3 with respect to packets having a lower priority.

In the second sequence #1, the basic processes are carried out for the input buffers in the following order. (A) the basic process for the second input buffer #1 with respect to packets having a higher priority.

(B) the basic process for the third input buffer #2 with respect to packets having a higher priority.

(C) the basic process for the fourth input buffer #3 with respect to packets having a higher priority.

(D) the basic process for the first input buffer #0 with respect to packets having a higher priority.

(E) the basic process for the second input buffer #1 with respect, to packets having a lower priority.

(F) the basic process for the third input buffer #2 with respect to packets having a lower priority.

(G) the basic process for the fourth input buffer #3 with respect to packets having a lower priority.

(H) the basic process for the first input buffer #0 with respect to packets having a lower priority.

In the third sequence #2, the basic processes are carried out for the. input buffers in the following order.

(A) the basic process for the third input buffer #2 with respect to packets having a higher priority.

(B) the basic process for the fourth input buffer #3 with respect to packets having a higher priority.

(C) the basic process for the first input buffer #0 with respect to packets having a higher priority.

(D) the basic process for the second input buffer #1 with respect to packets having a higher priority.

(E) the basic process for the third input buffer #2 with respect to packets having a lower priority.

(F) the basic process for the fourth input buffer #3 with respect to packets having a lower priority.

(G) the basic process for the first input buffer #0 with respect to packets having a lower priority.

(H) the basic process for the second input buffer #1 with respect to packets having a lower priority.

In the fourth sequence #3, the basic processes are carried out for the input buffers in the following order.

(A) the basic process for the fourth input buffer #3 with respect to packets having a higher priority.

(B) the basic process for the first input buffer #0 with respect to packets having a higher priority.

(C) the basic process for the second input buffer #1 with respect to packets having a higher priority.

(D) the basic process for the third input buffer #2 with respect to packets having a higher priority.

(E) the basic process for the fourth input buffer #3 with respect to packets having a lower priority.

(F) the basic process for the first input buffer #0 with respect to packets having a lower priority.

(G) the basic process for the second input buffer #1 with respect to packets having a lower priority.

(H) the basic process for the third input buffer #2 with respect to packets having a lower priority.

In accordance with the fifth embodiment, even if cells having a higher priority and cells having a lower priority accumulated in different input buffers are addressed to the same output port, an allowance to be output to the output port is certainly preferentially given to the cells having a higher priority.

Figure 23:
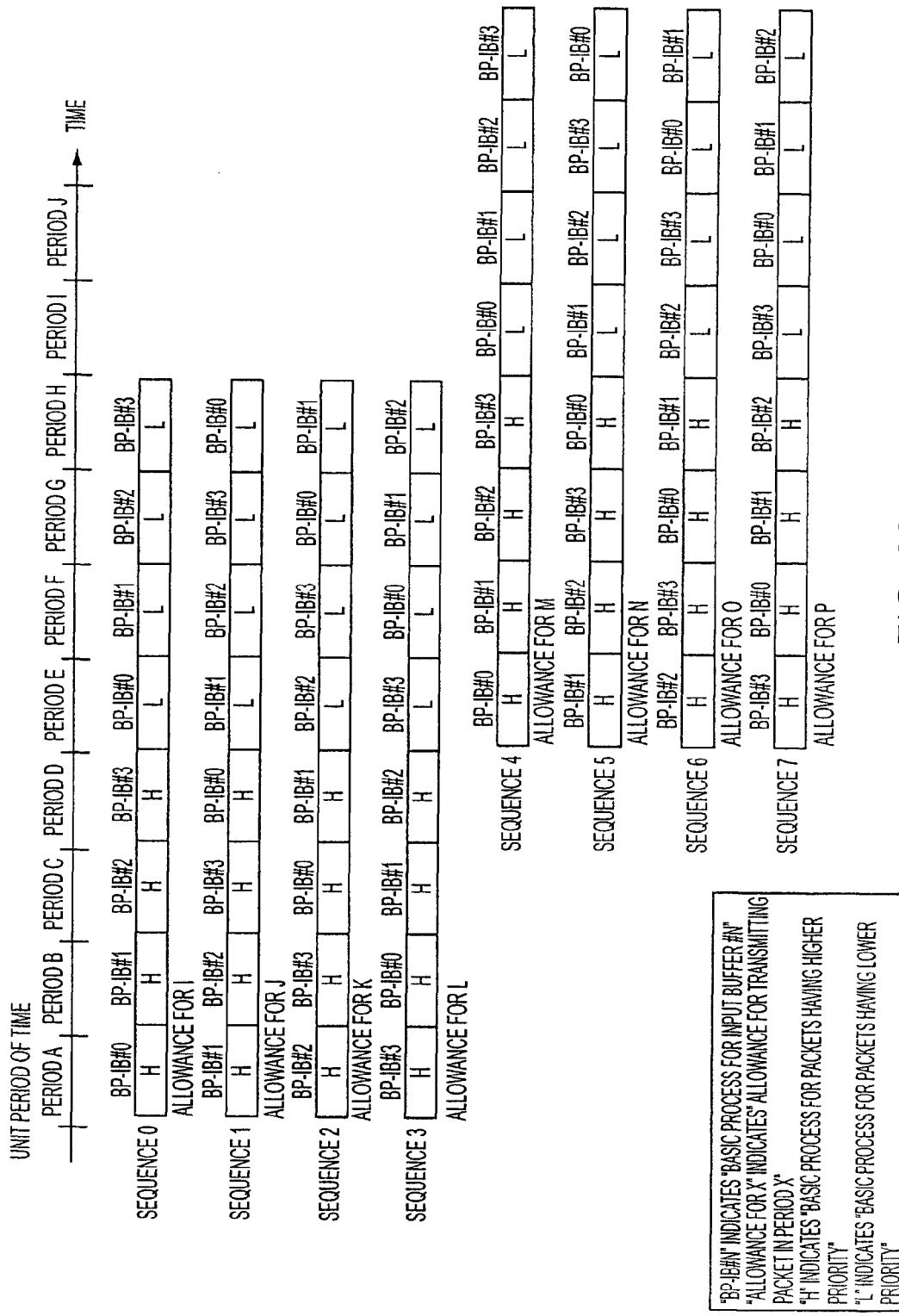
FIG. 23 is a timing chart showing a timing at which output sequential arbitration is carried out in accordance with the sixth embodiment.

FIG. 23 is a timing chart showing a timing at which each of sequences is carried out in the input sequential arbitration in the method of carrying out arbitration in a packet exchanger, in accordance with the sixth embodiment.

In the sixth embodiment, in the first to eighth sequences #0 to #7, the basic processes are carried out for all of the input buffers with respect to packets having a higher priority, and then, the basic processes are carried out for all of the input buffers with respect to packets having a lower priority.

In accordance with the sixth embodiment, the basic processes are carried out for all of the input buffers with respect to packets having a higher priority in the first to fourth sequences #1 to #3, and then, the basic processes are carried out in the fifth to eighth sequences #4 to #7.

In the sixth embodiment, the basic process is carried out in a unit 15 period of time. Hence, though the first to eighth sequence's #0 to #7 take a period of time twice greater than a period of time necessary for the same sequences in which the basic processes are carried out with respect to packets having no priority, it would be possible to transmit a packet at a maximum rate corresponding to a fine rate by doubling the number of the sequences to be concurrently carried out.

In the first sequence #0, the basic processes are carried out in the following order.

(A) the basic process for the first input buffer #0 with respect to packets having a higher priority.

(B) the basic process for the second input buffer #1 with respect to packets having a higher priority.

(C) the basic process for the third input buffer #2 with respect to packets having a higher priority.

(D) the basic process for the fourth input buffer #3 with respect to packets having a higher priority.

(E) the basic process for the first input buffer #0 with respect to packets having a lower priority.

(F) the basic process for the second input buffer #1 with respect to packets having a lower priority.

(G) the basic process for the third input buffer #2 with respect to packets having a lower priority.

(H) the basic process for the fourth input buffer #3 with respect to packets having a lower priority.

In the second sequence #1, the basic processes are carried out in the following order.

(A) the basic process for the second input buffer #1 with respect to packets having a higher priority.

(B) the basic process for the third input buffer #2 with respect to packets having a higher priority.

(C) the basic process for the fourth input buffer #3 with respect to packets having a higher priority.

(D) the basic process for the first input buffer #0 with respect to packets having a higher priority.

(E) the basic process for the second input buffer #1 with respect to packets having a lower priority.

(F) the basic process for the third input buffer #2 with respect to packets having a lower priority.

(G) the basic process for the fourth input buffer #3 with respect to packets having a lower priority.

(H) the basic process for the first input buffer #0 with respect to packets having a lower priority.

In the third sequence #2, the basic processes are carried out in the following order.

(A) the basic process for the third input buffer #2 with respect to packets having a higher priority.

(B) the basic process for the fourth input buffer #3 with respect to packets having a higher priority.

(C) the basic process for the first input buffer #0 with respect to packets having a higher priority.

(D) the basic process for the second input buffer #1 with respect to packets having a higher priority.

(E) the basic process for the third input buffer #2 with, respect to packets having a lower priority.

(F) the basic process for the fourth input buffer #3 with respect to packets having a lower priority.

(G) the basic process for the first input buffer #0 with respect to packets having a lower priority.

(H) the basic process for the second input buffer #1 with respect to packets having a lower priority.

In the fourth sequence #3, the basic processes are carried out in the following order.

(A) the basic process for the fourth input buffer #3 with respect to packets having a higher priority.

(B) the basic process for the first input buffer #0 with, respect to packets having a higher priority.

(C) the basic process for the second input buffer #1 with respect to packets having a higher priority.

(D) the basic process for the third input buffer #2 with respect to packets having a higher priority.

(E) the basic process for the fourth input buffer #3 with respect to packets having a lower priority.

(F) the basic process for the first input buffer #0 with respect to packets having a lower priority.

(G) the basic process for the second input buffer #1 with respect to packets having a lower priority.

(H) the basic process for the third input buffer #2 with respect to packets having a lower priority.

The fifth to eighth sequences #4 to #7 are carried out after the basic processes in the first to fourth sequences #0 to #3 with respect to packets having a higher priority have been completed.

In the fifth sequence #4, the basic processes are carried out in the following order.

(A) the basic process for the first input buffer #0 with respect to packets having a higher priority.

(B) the basic process for the second input buffer #1 with respect to packets having a higher priority.

(C) the basic process for the third input buffer #2 with respect to packets having a higher priority.

(D) the basic process for the fourth input buffer #3 with respect to packets having a higher priority.

(E) the basic process for the first input buffer #0 with respect to packets having a lower priority.

(F) the basic process for the second input buffer #1 with respect to packets having a lower priority.

(G) the basic process for the third input buffer #2 with respect to packets having a lower priority.

(H) the basic process for the fourth input buffer #3 with respect to packets having a lower priority.

In the sixth sequence #5, the basic processes are carried out in the following order.

(A) the basic process for the second input buffer #1 with respect to packets having a higher priority.

(B) the basic process for the third input buffer #2 with respect to packets having a higher priority.

(C) the basic process for the. fourth input buffer #3 with respect to packets having a higher priority.

(D) the basic process for the first input buffer #0 with respect to packets having a higher priority.

(E) the basic process for the second input buffer #1 with respect to packets having a lower priority.

(F) the basic process for the third input buffer #2 with respect to packets having a lower priority.

(G) the basic process for the fourth input buffer #3 with respect to packets having a lower priority.

(H) the basic process for the first input buffer #0 with respect to packets having a lower priority.

In the seventh sequence #6, the basic processes are carried out in the following order.

(A) the basic process for the third input buffer #2 with respect to packets having a higher priority.

(B) the basic process for the fourth input buffer #3 with respect to packets having a higher priority.

(C) the basic process for the first input buffer #0 with respect to packets having a higher priority.

(D) the basic process for the second input buffer #1 with respect to packets having a higher priority.

(E) the basic process for the third input buffer #2 with respect to packets having a lower priority.

(F) the basic process for the fourth input buffer #3 with respect to packets having a lower priority.

(G) the basic process for the first input buffer #0 with respect to packets having a lower priority.

(H) the basic process for the second input buffer #1 with respect to packets having a lower priority.

In the eighth sequence #7, the basic, processes are carried out in the following order.

(A) the basic process for the fourth input buffer #3 with respect to packets having a higher priority.

(B) the basic process for the first input buffer #0 with respect to packets having a higher priority.

(C) the basic process for the second input buffer #1 with, respect to packets having a higher priority.

(D) the basic process for the third input buffer #2 with respect to packets having a higher priority.

(E) the basic process for the fourth input' buffer #3 with respect to packets having a lower priority.

(F) the basic process for the first input buffer #0 with respect to packets having a lower priority.

(G) the basic process for the second input buffer #1 with respect to packets having a lower priority.

(H) the basic process for the third input buffer #2 with respect to packets having a lower priority.

In accordance with the sixth embodiment, even if cells having a higher priority and cells having a lower priority accumulated in different input buffers are addressed to the same output port, an allowance to be output to the output port is certainly preferentially given to the cells having a higher priority.

Figure 24:
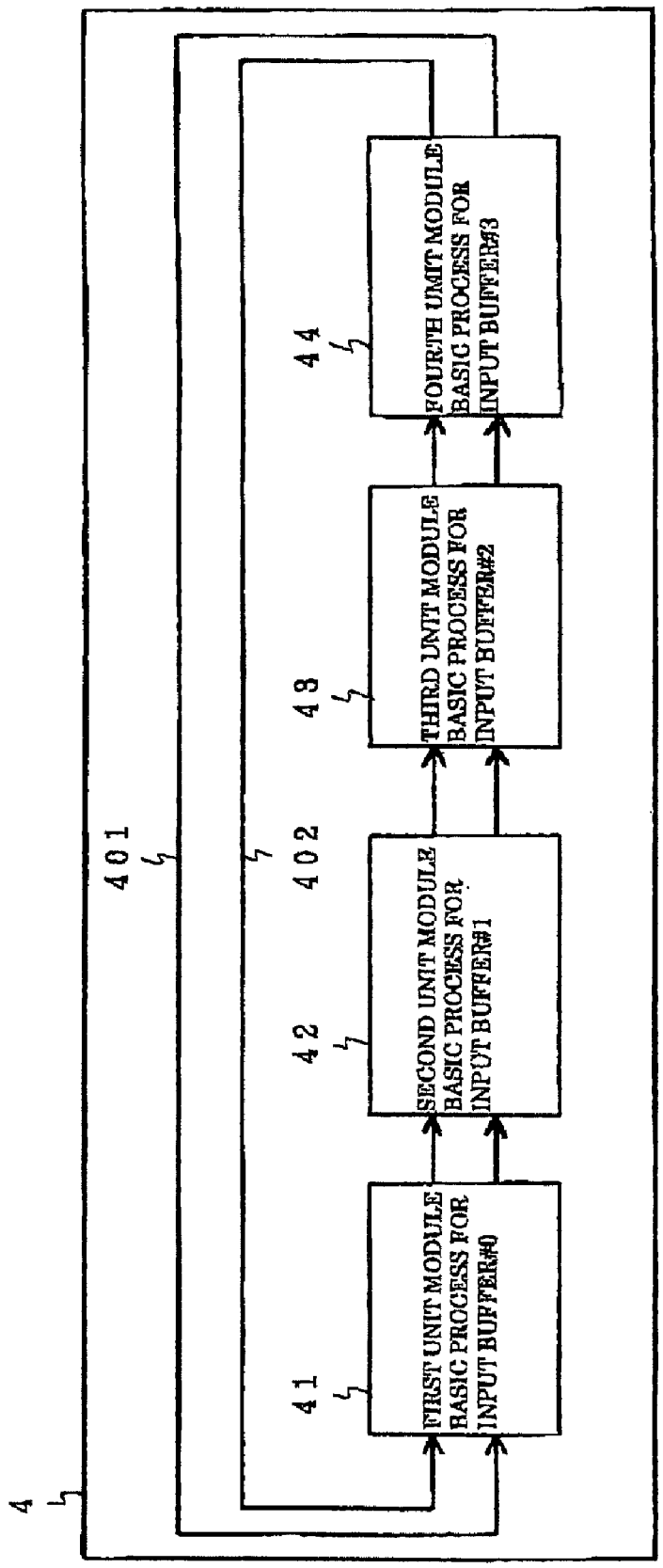
FIG. 24 is a block diagram of an arbiter circuit used in the sixth embodiment.

FIG. 24 is a block diagram of an arbiter circuit used in the sixth embodiment.

The illustrated arbiter circuit 4 is comprised of first to fourth unit modules 41 to 44 each carrying out the basic processes, a first signal line 401 connecting the first to fourth unit modules 41 to 44 to one another in a ring, and a second signal line 402 connecting first to fourth unit modules 41 to 44 to one another in a ring.

A signal having a higher priority is transmitted through the first signal fine 401, and a signal having a lower priority is transmitted through the second signal line 402.

A signal is transmitted through the first signal line 401 when the basic processes are carried out in the sequences with respect to packets having a higher priority. In contrast, a signal is transmitted through the second signal line 402 when the basic processes are carried out in the sequences with respect to packets having a lower priority. Thus, even if the basic processes are carried out in the first to fourth modules 41 to 44 with respect to both packets having a higher priority and packets having a lower priority, a signal indicating that the basic processes have been completed can be transmitted to the next stage unit modules.

The above-mentioned method of carrying out arbitration in a packet exchanger may be accomplished as a program including various commands, and be presented through a recording medium readable by a computer.

Figure 25:
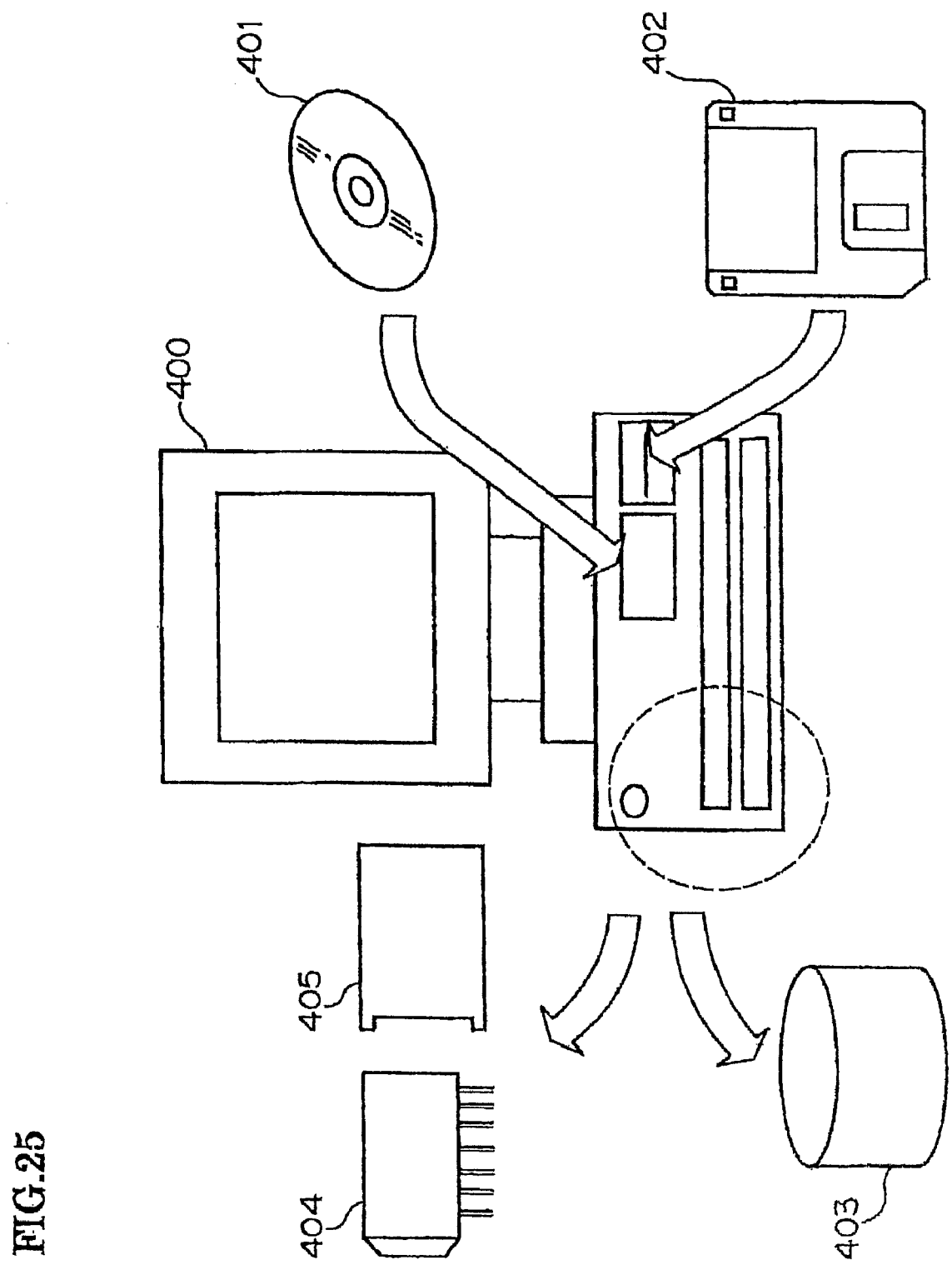
FIG. 25 illustrates examples of recording mediums in which a program for carrying out the method in accordance with the present invention is to be stored.

In the specification, the term "recording medium" means any medium which can record data therein. Examples of a recording medium are illustrated in FIG. 25.

The term "recording medium" includes, for instance, a disk-shaped recorder 401 such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk 402, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM 405 such as a compact flush card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

As a computer 400, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-090444 filed on Mar. 29, 2000 including specification, claims, drawings and summary is incorporated herein by reference in its entirety.

What is claimed is:

1. An arbiter circuit comprising:
a plurality of input buffers to temporarily store packets arriving at input ports; and
a packet switch to switch a packet between a particular input port of the plurality of input buffers and a particular output port, the packet switch being further to:
concurrently process a first plurality of sequences, each sequence including portions that make up a packet, and
assign packets, respectively associated with the first plurality of sequences, for output through the output ports at different times from one another, the packet switch including:
a plurality of unit modules, each of the plurality of unit modules being associated with at least one of the input buffers and at least one of the output ports, the plurality of unit modules to process the first plurality of sequences;
a first signal line connecting the plurality of unit modules in a ring, a first signal being transmitted through the first signal line in a first direction of the ring; and
a second signal line connecting the plurality of unit modules in the ring, a second signal being transmitted through the second signal line in a second direction in the ring, opposite to the first direction.

2. The arbiter circuit of claim 1, where the packet switch is further configured to concurrently process a second plurality of sequences after processing the first plurality of sequences.

3. The arbiter circuit of claim 2, where the packet switch is further configured to process the second plurality of sequences in an order opposite to an order in which the first plurality of sequences is processed.

4. The arbiter circuit of claim 1, where the packet switch is further configured to:
    select an input buffer to output a packet having a higher priority than other packets accumulated in the input buffers, and
    select an input buffer to output a packet having a lower priority that other packets accumulated in the input buffers.

5. The arbiter circuit of claim 1, where the second signal is of lower priority than the first signal.

6. The arbiter circuit of claim 1, where a number of the sequences is equal to a number of ports in a packet exchanger associated with the arbiter circuit.

7. The arbiter circuit of claim 1, where a number of the input buffers is equal to a number of the first plurality of sequences.

8. A device comprising:
    a plurality of input ports to each receive sequences that define a packet;
    a plurality of output ports; and
    a packet switch to:
    concurrently process multiple ones of the received sequences,
    where, when concurrently processing the multiple ones of the received sequences, the packet switch is to select an output port for each of the received sequences, and transfer the received sequences to the selected output ports for output from the device at different times from one another, the packet switch including:
        a plurality of processing modules to process the multiple ones of the received sequences;
        a first signal line connecting the plurality of processing modules in a ring configuration; and
        a second signal line connecting the plurality of processing modules in the ring configuration, the second signal line controlling the plurality of processing modules for a lower priority signal relative to the first signal line.

9. The device of claim 8, where, when concurrently processing the multiple ones of the received sequences, the packet switch is configured to:
    select output ports of the plurality of output ports to map to the input ports, the selected output ports being selected from among ones of the plurality of output ports that have not already been mapped to one or more of the plurality of input ports.

10. The device of claim 8, where a number of the plurality of input ports corresponds to a number of the received sequences.

* * * * *